United States Patent
Lee et al.

(10) Patent No.: US 11,337,272 B2
(45) Date of Patent: May 17, 2022

(54) METHOD AND APPARATUS FOR CONNECTING USER TERMINALS AS A GROUP AND PROVIDING SERVICE INCLUDING CONTENTS ASSOCIATED WITH THE GROUP

(71) Applicant: LINE Corporation, Tokyo (JP)

(72) Inventors: Dongwon Lee, Seongnam-si (KR); Jungjun Park, Seongnam-si (KR); In Won Cho, Seongnam-si (KR); Jongjin Cho, Seongnam-si (KR)

(73) Assignee: Line Corporation, Tokyo (JP)

( * ) Notice: Subject to any disclaimer, the term of this patent is extended or adjusted under 35 U.S.C. 154(b) by 38 days.

(21) Appl. No.: 16/786,397

(22) Filed: Feb. 10, 2020

(65) Prior Publication Data
US 2020/0187300 A1    Jun. 11, 2020

Related U.S. Application Data

(63) Continuation of application No. PCT/KR2017/009303, filed on Aug. 25, 2017.

(51) Int. Cl.
    *H04W 88/04*      (2009.01)
    *H04L 51/046*      (2022.01)

(52) U.S. Cl.
    CPC ........... *H04W 88/04* (2013.01); *H04L 51/046* (2013.01)

(58) Field of Classification Search
    CPC .............................. H04W 88/04; H04L 51/046
    USPC .......................................... 370/310, 328, 338
    See application file for complete search history.

(56) References Cited

U.S. PATENT DOCUMENTS

| | | | | |
|---|---|---|---|---|
| 9,973,732 | B1* | 5/2018 | Goetz | H04N 5/23219 |
| 2014/0123253 | A1* | 5/2014 | Davis | G06F 21/316 |
| | | | | 726/6 |
| 2014/0187221 | A1* | 7/2014 | Ramachandran | H04M 1/72484 |
| | | | | 455/418 |
| 2014/0229614 | A1* | 8/2014 | Aggarwal | H04M 3/2236 |
| | | | | 709/224 |
| 2017/0208424 | A1* | 7/2017 | Longjie | H04W 8/005 |

(Continued)

FOREIGN PATENT DOCUMENTS

| | | |
|---|---|---|
| JP | 2004-341576 A | 12/2004 |
| JP | 2010-154377 A | 7/2010 |
| JP | 2015-73182 A | 4/2015 |

(Continued)

OTHER PUBLICATIONS

Search Report for International Application No. PCT/KR2017/009303 dated May 25, 2018.

(Continued)

*Primary Examiner* — Obaidul Huq
(74) *Attorney, Agent, or Firm* — Harness, Dickey & Pierce, P.L.C.

(57) ABSTRACT

A connection service providing method includes outputting, by a first user terminal from among a plurality of user terminals, a connection request signal to at least one second user terminal among the plurality of user terminals through an inaudible frequency range based on a trigger signal for initiating a connection between the plurality of user terminals; and connecting the at least one second user terminal and the first user terminal as a group; and providing a connection service associated with the group on the first user terminal.

26 Claims, 15 Drawing Sheets

(56) References Cited

U.S. PATENT DOCUMENTS

2019/0007801 A1* 1/2019 Chaki .................. H04W 76/23

FOREIGN PATENT DOCUMENTS

| | | |
|---|---|---|
| JP | 2016-25472 A | 2/2016 |
| JP | 2016-58869 A | 4/2016 |
| KR | 10-2006-0100692 A | 9/2006 |
| KR | 10-2012-0135717 A | 12/2012 |
| KR | 10-1442544 B1 | 9/2014 |
| KR | 10-2016-0150550 A | 12/2016 |

OTHER PUBLICATIONS

Office Action for corresponding Japanese Patent Application No. 2020-511232 dated Jul. 6, 2021.

* cited by examiner

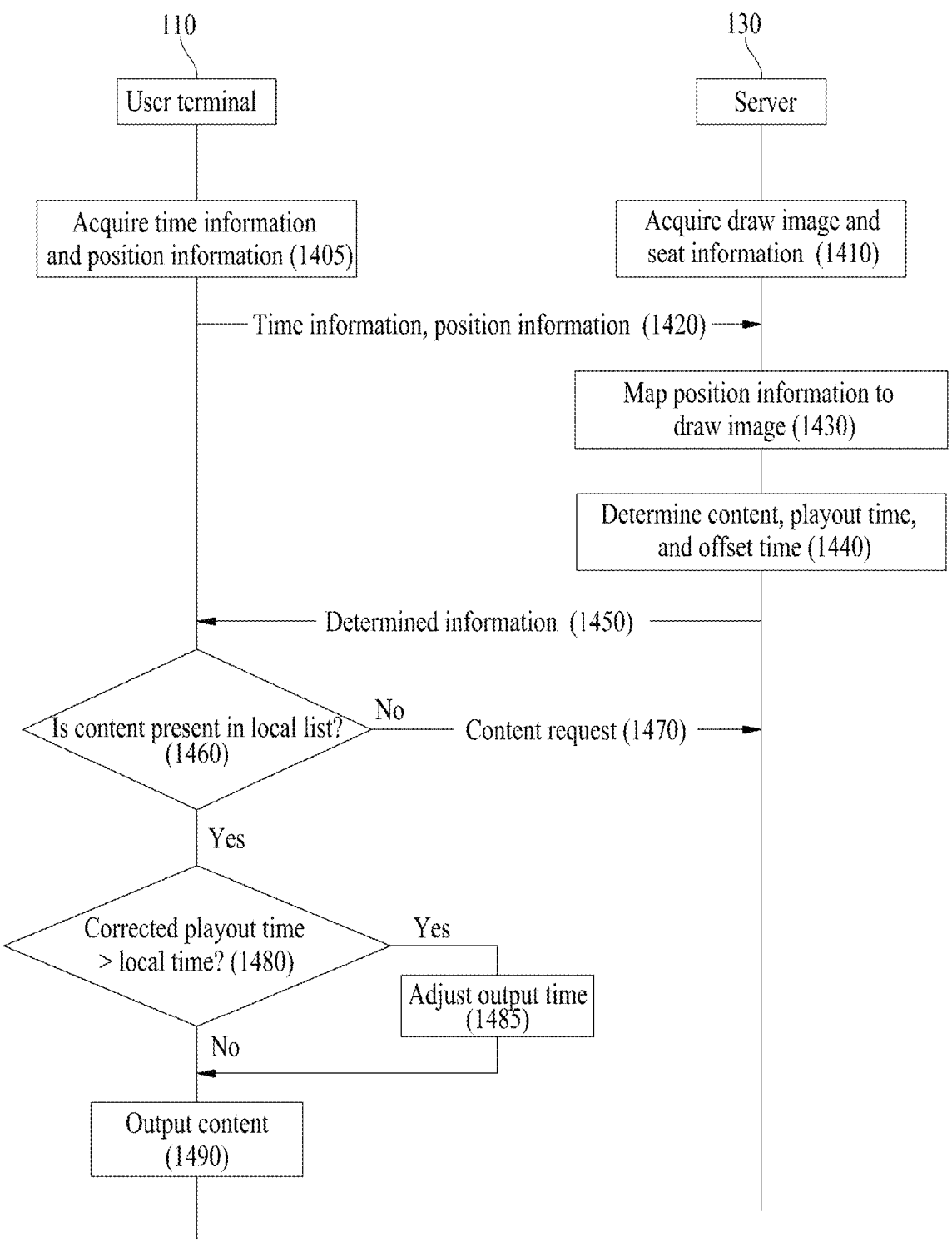

METHOD AND APPARATUS FOR CONNECTING USER TERMINALS AS A GROUP AND PROVIDING SERVICE INCLUDING CONTENTS ASSOCIATED WITH THE GROUP

CROSS-REFERENCE TO RELATED APPLICATIONS

This U.S. non-provisional application is a continuation application of, and claims the benefit of priority under 35 U.S.C. § 365(c) from International Application PCT/KR2017/009303, which has an International filing date of Aug. 25, 2017, the entire contents of which are incorporated herein by reference in their entirety.

BACKGROUND

1. Field

One or more example embodiments relate to a method, system, apparatus, and/or non-transitory computer readable record medium for connecting a plurality of user terminals as a group, and more particularly, to a method, system, apparatus, and/or non-transitory computer readable record medium for connecting a plurality of user terminals as a group and providing a service including content associated with the group to each of the user terminals.

2. Related Art

Currently, there is an increasing interest in technology for interconnecting a plurality of electronic devices, such as user terminals, and sharing content or transmitting and receiving messages between the interconnected electronic devices. Such connection between the plurality of electronic devices may be performed through pairing by wireless communication such as Bluetooth, or may be performed by transmitting a request message from a specific electronic device to another electronic device to be connected and by receiving an approval from the other electronic device receiving the request message. If a number of electronic devices to be connected is at least hundreds (or thousands, tens of thousands), the method of interconnecting electronic devices may not quickly perform a connection between the hundreds, or more, of electronic devices.

Also, if a connection between electronic devices is performed in a noisy and crowded place, it is difficult for users to transmit and receive a request message for the connection between electronic devices. Therefore, the connection between the electronic devices may not be efficiently performed.

Therefore, there is a need for a method and apparatus that may quickly and conveniently perform a connection between hundreds of or more electronic devices and may complete a connection between electronic devices without being limited to a place where the connection between the electronic devices is performed.

A method of retrieving a near field wireless device through a mobile terminal, simply pairing the retrieved wireless device, and displaying a wireless device having a priority in an upper portion of a display area is described in Korean Patent Laid-Open Publication No. 10-2009-0066102 (published on Jun. 23, 2009).

The aforementioned information is provided to assist understanding and may include content that is not a portion of the related art and may not include content providable to those skilled in the art.

SUMMARY

According to at least some example embodiments, a connection service providing method includes outputting, by a first user terminal from among a plurality of user terminals, a connection request signal to at least one second user terminal among the plurality of user terminals through an inaudible frequency range based on a trigger signal for initiating a connection between the plurality of user terminals; connecting the at least one second user terminal and the first user terminal as a group; and providing a connection service associated with the group on the first user terminal.

The connection request signal may include information used for the second user terminal to output a connection request signal to at least one third user terminal to connect the at least one third user terminal among the plurality of user terminals as the group.

The trigger signal may be a signal that is acquired by the first user terminal in response to joining a first chatroom of a messenger program installed on the first user terminal, a signal that is received from an outside through the inaudible frequency range, or data that is acquired by identifying a first code.

User terminals belonging to the group may be synchronized based on time information of the respective user terminals, and the connection service may include content provided for at least a portion of the synchronized user terminals.

The method may further include acquiring position information about a position of the first user terminal, wherein the connection service includes content associated with the position information.

The position information may be acquired through the inaudible frequency range at the position, or acquired by identifying a first code present at the position.

The connection service may be configured to provide a screen output corresponding to position information about a position of each user terminal of at least a portion of the user terminals belonging to the group to said each user terminal, and the screen output of said each user terminal belonging to the group configures a portion of a semantic entity that is formed by screen outputs of a plurality of user terminals among the user terminals belonging to the group.

The connection service may include at least one content among the same text output, the same audio output, and the same screen output provided to at least a portion of user terminals belonging to the group.

The connection service may include content including the same audio provided to at least a portion of the user terminals belonging to the group, and wherein the audio is automatically output to at least a portion of the user terminals at a first timing.

At least one of user terminals belonging to the group may be determined as a winning terminal, and in response to the first user terminal being determined as the winning terminal, content including a video or an image captured by the first user terminal may be provided as the connection service to at least a portion of the user terminals belonging to the group.

The method may further include transmitting the captured video or image to an external display device or a server that manages the external display device to display the captured video or image on the external display device.

The connection service may include a composite image or a composite video provided to at least a portion of user terminals belonging to the group, and wherein the composite video or the composite image is generated by composing images or videos captured by user terminals present at a first position among the user terminals belonging to the group.

The method may further include, in response to the first user terminal being determined to be present at the first position based on position information about a position of the first user terminal, transmitting an image or a video captured by the first user terminal to a server; and receiving content comprising the composite video or the composite image as from the server.

The composite video or the composite image may be content to which a three-dimensional (3D) effect or a dynamic effect is applied.

In response to a user terminal of a user having a personal relationship with a user of the first user terminal being included in user terminals belonging to the group, the connection service includes content including information about the user having the personal relationship.

The method may further include transmitting time information and position information associated with the first user terminal to a server that provides the connection service, wherein the providing of the connection service includes, receiving information about first content and information about an output time of the content from the server; and outputting the first content at a time that is determined based on information about the output time.

The outputting of the first content may include searching the first user terminal for the first content based on information about the first content and outputting the first content, and in response to the first content being absent in the first user terminal, requesting the server for the first content and outputting the first content received from the server.

The time information may include information about a global positioning system (GPS) time and a local time of the first user terminal at a time at which corresponding time information is acquired, the information about the output time includes a first output time at which the content is to be output, and the outputting of the first content includes outputting the first content at a time that is determined based on offset time information calculated based on the local time of the first user terminal, the first output time, and the time information.

The offset time information may be a difference between the GPS time and the local time of the first user terminal at the time at which the time information is acquired, and the outputting of the first content may include outputting the content at the local time of the first user terminal corresponding to a corrected output time that is determined based on the first output time and the offset time information.

The outputting of the first content may include shifting and outputting the content by an elapse time if the local time of the user terminal passes the corrected output time.

According to at least some example embodiments, a non-transitory computer-readable record medium stores computer instructions that, when executed by a processor, cause the processor to perform the connection service providing method.

According to at least some example embodiments, a first electronic device includes processing circuitry configured to output a connection request signal to at least a second electronic device through an inaudible frequency range based on a trigger signal for initiating a connection between a plurality of electronic devices, the plurality of devices including the first and second electronic device, connect the second electronic device and the first electronic device as a group, and provide a connection service associated with the group on the first electronic device.

The processing circuitry may be further configured to acquire position information about a position of the electronic device.

According to at least some example embodiments, a connection service providing method may include identifying, by a server, that a first user terminal and a second user terminal are connected as a group in response to a connection request signal that is output from the first user terminal to at least one second user terminal through an inaudible frequency range; and providing a connection service associated with the group to at least a portion of user terminals belonging to the group.

The method may further include receiving time information and position information associated with each user terminal from each of the first user terminal and the second user terminal, wherein the providing of the connection service includes, determining information about first content to be output from user terminals belonging to the group and information about an output time at which the first content is to be output, based on the received position information and time information; and transmitting the determined information about the first content and information about the output time to at least a portion of the user terminals belonging to the group.

The determining may include determining information about content to be output from each of the user terminals belonging to the group based on position information received from each of one or more user terminals from among the user terminals belonging to the group; and determining offset time information associated with one or more user terminals from among the user terminals belonging to the group based on time information received from user terminals belonging to the group, the offset time information associated with each of the user terminals belonging to the group being a difference between a global position system (GPS) time and a local time indicated by time information of each corresponding user terminal.

The method may include mapping each received position information to an image associated with a place where a connection as the group is performed.

According to at least some example embodiments, a server that provides a connection service includes processing circuitry configured to receive a signal from at least one user terminal among a plurality of user terminals identify, based on the received signal, that a first user terminal and a second user terminal are connected as a group based on a connection request signal that is output from the first user terminal to at least the second user terminal through an inaudible frequency range, and provide a connection service associated with the group to at least a portion of user terminals belonging to the group.

BRIEF DESCRIPTION OF DRAWINGS

The above and other features and advantages of example embodiments of the inventive concepts will become more apparent by describing in detail example embodiments with reference to the attached drawings. The accompanying drawings are intended to depict example embodiments and should not be interpreted to limit the intended scope of the claims. The accompanying drawings are not to be considered as drawn to scale unless explicitly noted.

FIG. 14 is a flow diagram illustrating an example of a method of providing a connection service from a connection service providing server to a user terminal based on space information and time information acquired from the user terminal according to an example embodiment.

DETAILED DESCRIPTION

Figure 1:
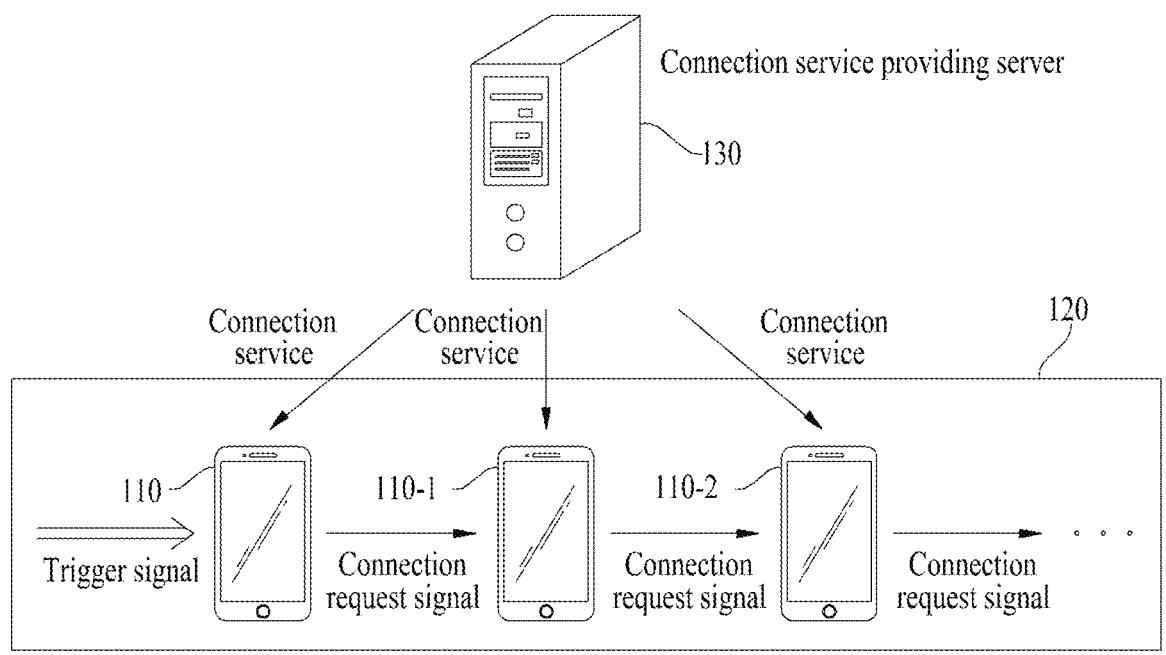
FIG. 1 illustrates an example of a method of connecting a plurality of user terminals as a group and providing a connection service to the user terminals according to an example embodiment.

One or more example embodiments will be described in detail with reference to the accompanying drawings. Example embodiments, however, may be embodied in various different forms, and should not be construed as being limited to only the illustrated embodiments. Rather, the illustrated embodiments are provided as examples so that this disclosure will be thorough and complete, and will fully convey the concepts of this disclosure to those skilled in the art. Accordingly, known processes, elements, and techniques, may not be described with respect to some example embodiments. Unless otherwise noted, like reference characters denote like elements throughout the attached drawings and written description, and thus descriptions will not be repeated.

As used herein, the singular forms "a," "an," and "the," are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups, thereof. As used herein, the term "and/or" includes any and all combinations of one or more of the associated listed products. Expressions such as "at least one of," when preceding a list of elements, modify the entire list of elements and do not modify the individual elements of the list. Also, the term "exemplary" is intended to refer to an example or illustration.

Unless otherwise defined, all terms (including technical and scientific terms) used herein have the same meaning as commonly understood by one of ordinary skill in the art to which example embodiments belong. Terms, such as those defined in commonly used dictionaries, should be interpreted as having a meaning that is consistent with their meaning in the context of the relevant art and/or this disclosure, and should not be interpreted in an idealized or overly formal sense unless expressly so defined herein.

Software may include a computer program, program code, instructions, or some combination thereof, for independently or collectively instructing or configuring a hardware device to operate as desired. The computer program and/or program code may include program or computer-readable instructions, software components, software modules, data files, data structures, and/or the like, capable of being implemented by one or more hardware devices, such as one or more of the hardware devices mentioned above. Examples of program code include both machine code produced by a compiler and higher level program code that is executed using an interpreter.

A hardware device, such as a computer processing device, may run an operating system (OS) and one or more software applications that run on the OS. The computer processing device also may access, store, manipulate, process, and create data in response to execution of the software. For simplicity, one or more example embodiments may be exemplified as one computer processing device; however, one skilled in the art will appreciate that a hardware device may include multiple processing elements and multiple types of processing elements. For example, a hardware device may include multiple processors or a processor and a controller. In addition, other processing configurations are possible, such as parallel processors.

Although described with reference to specific examples and drawings, modifications, additions and substitutions of example embodiments may be variously made according to the description by those of ordinary skill in the art. For example, the described techniques may be performed in an order different with that of the methods described, and/or components such as the described system, architecture, devices, circuit, and the like, may be connected or combined to be different from the above-described methods, or results may be appropriately achieved by other components or equivalents.

Hereinafter, example embodiments will be described with reference to the accompanying drawings.

The term "service" provided on (interchangeably used with provided to be displayed on and displayed on) a user terminal may refer to any type of content, for example, content including at least one of a text, an audio, and an image, output on the user terminal or data including the content.

The expression "providing a service to a user terminal" relates to providing a service on a user terminal, for example, outputting or displaying a service or content through a display or a speaker of the user terminal, and providing a service to a user of the user terminal.

FIG. 1 illustrates an example of a method of connecting a plurality of user terminals as a group and providing a connection service to the user terminals according to an example embodiment.

Hereinafter, a method of interconnecting a plurality of user terminals as a group 120 and providing a connection service from a connection service providing server 130 to at least a portion of (or each of) user terminals belonging to the group 120 is described with reference to FIG. 1. Each of the user terminals belonging to the group 120 may be, for example, a smartphone as shown in FIG. 1.

Referring to FIG. 1, each of user terminals 110, 110-1, 110-2, . . . , belonging to the group 120 may refer to an electronic device controllable by a user and may be configured to transmit and receive a connection request signal for connecting the user terminals 110, 110-1, 110-2, . . . , as the group 120.

Referring to FIG. 1, a connection between the user terminals 110, 110-1, 110-2, . . . , may start from the user terminal 110 that acquires a trigger signal for initiating the connection between the plurality of user terminals 110, 110-1, 110-2, . . . . Although FIG. 1 illustrates that the user terminal 110 acquires the trigger signal, at least one of the user terminals 110, 110-1, 110-2, . . . may acquire the trigger signal.

The user terminal 110 that acquires the trigger signal may output the connection request signal to at least one another user terminal, for example, the user terminal 110-1, among the plurality of user terminals 110, 110-1, 110-2, . . . through an inaudible frequency range. The other user terminal 110-1 and the user terminal 110 may be connected as the group 120. The other user terminal 110-1 may be present within arrival range of the connection request signal output from the user terminal 110. Although FIG. 1 illustrates that a single other user terminal 110-1 receives the connection request signal from the user terminal 110, a plurality of other user terminals 110-1 may be present.

The connection request signal may be a sound signal that is transmitted through the inaudible frequency range. The inaudible frequency range may be a frequency range in which the user cannot hear sound. A signal transmitted through the inaudible frequency range does not interfere with a signal transmitted through a frequency range in which a user can hear sound. Therefore, the connection between the user terminals 110, 110-1, 110-2, . . . may be performed regardless of noise and crowdedness of a place whether the connection is performed.

The connection request signal may be output through a speaker included in a corresponding user terminal and may be received through a microphone included in the user terminal.

The other user terminal 110-1 may receive the connection request signal and may output the connection request signal to still another user terminal 110-2. Still another user terminal 110-2 present within coverage of the connection request signal output from the other user terminal 110-1 may be connected to the user terminals 110 and 110-1 as the group 120.

That is, the connection request signal output from the user terminal 110 may include information used for the other user terminal 110-1 to output the connection request signal to still another user terminal 110-2 to connect still another user terminal 110-2 among the plurality of user terminals 110, 110-1, 110-2, . . . , as the group 120.

Meanwhile, still another user terminal 110-2 may also output the connection request signal and the user terminal(s) present within coverage of the connection request signal output from still another user terminal 110-2 may be connected as the group 120. Accordingly, the entire user terminals 110, 110-1, 110-2, . . . may be concatenated as the group 120.

Output of the connection request signal by the user terminal 110-1 or 110-2 may be performed substantially or almost at the same time at which the connection request signal is received at the corresponding user terminal 110-1 or 110-2.

Accordingly, connection with respect to the entire user terminals 110, 110-1, 110-2, . . . may be performed substantially or nearly at the same time or within a short period of time.

The connection service providing server 130 may provide a connection service to at least a portion of (or each of) the user terminals 110, 110-1, 110-2, . . . belonging to the group 120, and the connection service may be output to each of at least a portion of the user terminals 110, 110-1, 110-2, . . . belonging to the group 120. Here, the provided connection service may include content associated with the group 120.

The user terminals 110, 110-1, 110-2, . . . may be positioned in a crowded and noisy place, such as, for example, a sports venue or a performance venue. That is, the user terminals 110, 110-1, 110-2, . . . may correspond to user terminals owned by audiences of the sports venue or the performance venue. The connection service provided to at least a portion of (or each of) the user terminals 110, 110-1, 110-2, . . . may include content associated with an event of the sports venue or the performance venue in which the user terminals 110, 110-1, 110-2, . . . are present. Therefore, users of the user terminals 110, 110-1, 110-2, . . . may further enjoy the event through the provided connection service.

A connection method by transmitting and receiving a connection request signal between the user terminals 110, 110-1, 110-2, . . . and a connection service provided to at least a portion of or each of the user terminals 110, 110-1, 110-2, . . . are further described with reference to FIGS. 2 to 12.

Figure 2:
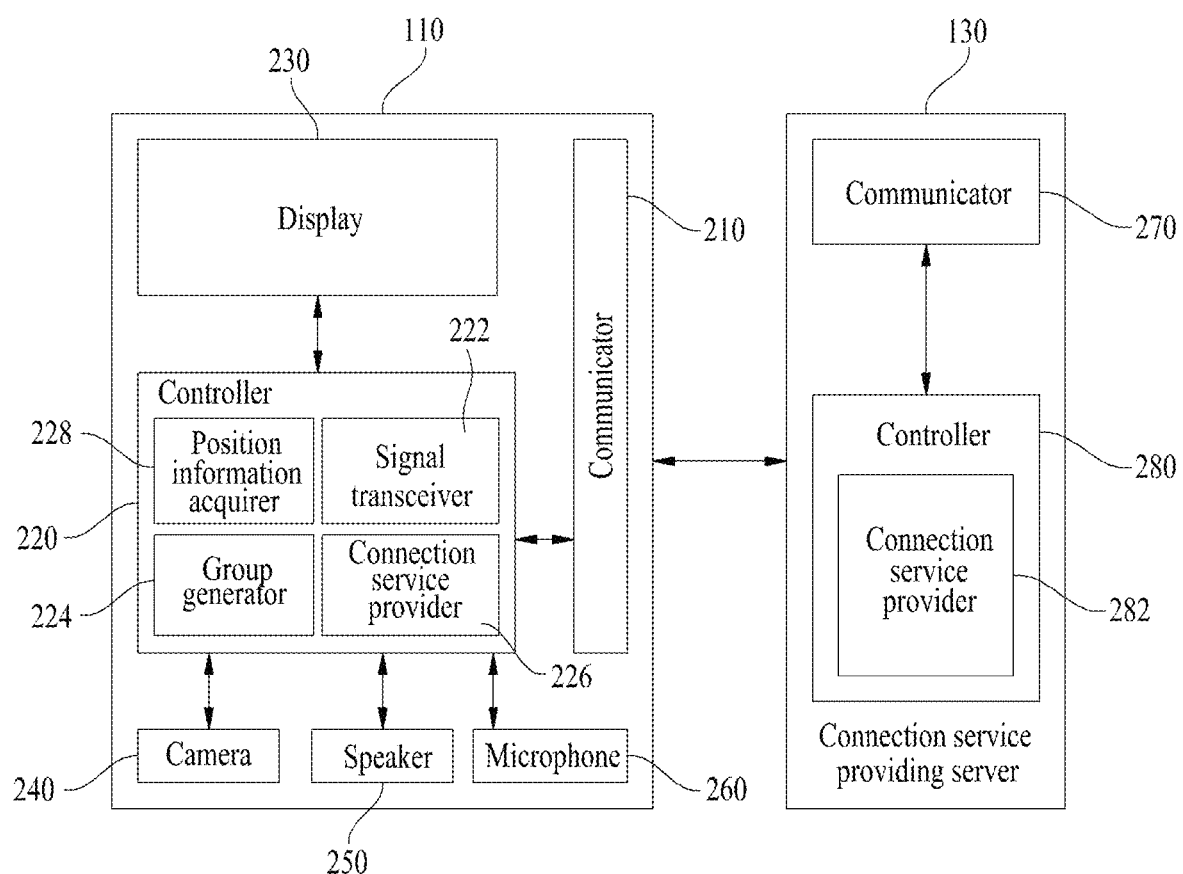
FIG. 2 illustrates an example of a user terminal configured to connect to another user terminal as a group and a connection service providing server configured to provide a connection service according to an example embodiment.

FIG. 2 illustrates an example of a user terminal configured to connect to another user terminal as a group and a connection service providing server configured to provide a connection service according to an example embodiment.

FIG. 2 illustrates a structure of the user terminal 110 and the connection service providing server 130. The following description related to the structure of the user terminal 110 may apply to a structure of the user terminals 110-1, 110-2, . . . and further description is omitted.

The user terminal 110 refers to an electronic device configured to transmit and receive a connection request signal for a connection with another user terminal and to receive a connection service from the connection service providing server 130 and to output the connection service. For example, the user terminal 110 may be a terminal used by a user, such as a smartphone, a personal computer (PC), a laptop computer, a tablet, an Internet of Things (IoT) device, and a wearable computer. The user terminal 110 may be configured to acquire or receive a trigger signal for initiating a connection between a plurality of user terminals.

Referring to FIG. 2, the user terminal 110 may include a communicator 210, a controller 220, a display 230, a camera 240, a speaker 250, and a microphone 260.

The communicator 210 may be a device used for a communication between the user terminal 110 and a server or another user terminal. That is, the communicator 210 may be a hardware module, for example, a network interface card, a network interface chip, a networking interface port, etc., of the user terminal 110 or a software module, for example, a network device driver and a networking program, configured to transmit and receive data and/or information to and from the server or the other user terminal.

The controller 220 may manage components of the user terminal 110 and may execute a program or an application used by the user terminal 110. For example, the controller 220 may transmit and receive a connection request signal by generating and/or forwarding the connection request signal, and may control the user terminal 110 to connect to the other user terminal and may control the user terminal 110 to output a connection service provided from the connection service providing server 130 through the display 230.

The controller 220 may execute a program or an application required for connection to the other user terminal and output of the connection service, and may process an operation required to execute the program or the application and to process data. Also, the controller 220 may be configured to process data received from the server and the other user terminal. Also, the controller 220 may be at least one processor of the user terminal 110 or may be at least one core included in the processor.

The controller 220 may include a signal transceiver 222 configured to transmit and receive the connection request signal and to acquire the trigger signal, a group generator 224 configured to connect to another user terminal as a group, a connection service provider 226 configured to provide (output, display) a connection service through the display 230, and a position information acquirer 228 configured to acquire position information about a position of the user terminal 110.

In response to the trigger signal for initiating the connection between the plurality of user terminals (electronic devices), the signal transceiver 222 may output the connection request signal to at least one another user terminal among the plurality of user terminals through an inaudible frequency range.

The group generator 224 may connect the other user terminal receiving the connection request signal to the user terminal 110 as a group. The connection with the other user terminal by the group generator 224 may be performed in response to an agreement from the other user terminal receiving the connection request signal on the connection. For example, a message asking whether to agree with the connection may be displayed through a popup window on a display of the other user terminal that receives the connection request signal.

The connection service provider 226 may provide the connection service associated with the group to be displayed on the user terminal 110. The connection service may be received from the connection service providing server 130 through the communicator 210, and may be displayed on the display 230 under control of the connection service provider 226.

The position information acquirer 228 may acquire position information about the position of the user terminal 110. The position information acquirer 228 may acquire the position information based on data acquired by a sensor or another configuration of the user terminal 110 in association with the position of the user terminal 110. For example, the position information acquirer 228 may acquire the position information from data acquired from a global positioning system (GPS) module (not shown), data about a code identified by the camera 240, or a signal input through the microphone 260.

Further description related to functions and operations of components, for example, the signal transceiver 222, the group generator 224, the connection service provider 226, and the position information acquirer 228, of the controller 220 is further described with reference to FIGS. 3 to 12. The aforementioned components, for example, the signal transceiver 222, the group generator 224, the connection service provider 226, and the position information acquirer 228, of the controller 220 may be configured in at least one processor and thus, functions and operations thereof may be executed by the at least one processor.

Further, according to at least some example embodiments, the controller 220 may be or include processing circuitry such as hardware including logic circuits; a hardware/software combination executing software; or a combination thereof. For example, the processing circuitry more specifically may include, but is not limited to, a central processing unit (CPU), an arithmetic logic unit (ALU), a digital signal processor, a microcomputer, a field programmable gate array (FPGA), and programmable logic unit, a microprocessor, application-specific integrated circuit (ASIC), etc. According to at least some example embodiments, the hardware and/or hardware/software combination of the aforementioned processing circuitry is configured to perform or control all operations discussed in the present disclosure as being performed by the user terminal 110, the controller 220, or any element of the user terminal 110 or controller 220.

The display 230 may display data input from the user of the user terminal 110 or may display content included in the connection service received from the connection service providing server 130. For example, the display 230 may include a touchscreen. In this case, the display 230 may include a function of an input device configured to receive a setting and a request from the user.

The camera 240 may be a device configured to capture an object. The camera 240 may include an image sensor configured to generate a video or an image by capturing the object.

The speaker 250 may be a device configured to output an audio signal, such as an audio. For example, the speaker 250 may output an audio the user can hear and a sound signal of an inaudible frequency range the user cannot hear. The sound signal of the inaudible frequency range may be used as the connection request signal. That is, the connection request signal generated by the signal transceiver 222 may be output to the other user terminal through the speaker 250.

The microphone 260 may be a device configured to receive an audio signal, such as an audio. Also, the microphone 260 may receive an audio signal of an inaudible frequency range from a speaker of the other user terminal. That is, the microphone 260 may receive the connection request signal from the other user terminal, or may receive the audio signal of the inaudible frequency range as a trigger signal.

The inaudible frequency range may be, for example, a high frequency band of over 20 kHz. Also, the inaudible frequency range may include a frequency (e.g., a frequency of between 10 kHz and 20 kHz modulated using a quadrature-orthogonal keying (QOK) modulation method) of sound substantially unrecognizable by a human. That is, an inaudible frequency may be a frequency in contrast to an audible frequency or a frequency of sound a human can hear but cannot perceive with ears. In the example embodiment, the term "inaudible frequency band" may refer to a frequency band that allows transmission and reception of a signal through the microphone 260 and the speaker 250, instead of using an antenna used for wireless communication.

A sound signal of the inaudible frequency range may be input and output through a separate signal receiving device and output device.

Also, although not illustrated, the user terminal 110 may include a storage as a device configured to store data or information. The storage may include any type of memory or storage device. The storage may store a program or an application executed by the controller 220 and information related thereto. For example, the storage may store a video and an image captured by the camera 240 and content including a connection service that is provided from the connection service providing server 130.

The connection service providing server 130 (hereinafter, referred to as the server 130) may generate and provide the connection service to at least a portion of (or each of) user terminals belonging to the group. The server 130 may generate and provide the connection service in response to a request from a specific user terminal among the user terminals belonging to the group.

The server 130 may include a communicator 270 and a controller 280.

The communicator 270 may refer to a device for communication between the server 130 and another server or user terminal(s). That is, the communicator 270 may be a hardware module, such as, for example, a network interface card, a network interface chip, a networking interface port, etc., of the server 130 or a software module, such as, for example, a network device driver or a networking program, configured to transmit and receive data and/or information to and from the other server or user terminal(s).

The controller 280 may manage any or all components of the server 130 and may execute a program or an application used by the server 130. Also, the server 130 may process an operation required to execute the program or the application and to process data. Also, the controller 280 may be configured to process data received from the other server and user terminal(s). The controller 280 may be at least one processor of the server 130 or at least one core in the processor.

The controller 280 may include a connection service provider 282 configured to generate a connection service to be provided to the user terminals belonging to the group and to provide the connection service to at least a portion of (or each of) the user terminals belonging to the group through the communicator 270.

In response to a connection request signal output from a first user terminal (e.g., the user terminal 110) receiving the trigger signal to at least one second user terminal (the other user terminal) through the inaudible frequency range, the connection service provider 282 may identify that the first user terminal and the second user terminal are connected as a group and may provide the connection service associated with the group to at least a portion of (or each of) the user terminals belonging to the group.

Based on a signal received from at least one of the plurality of user terminals belonging to the group by the communicator 270, the controller 280 may identify that the corresponding plurality of user terminals is connected as the group.

Further, according to at least some example embodiments, the controller 280 may be or include processing circuitry such as hardware including logic circuits; a hardware/software combination executing software; or a combination thereof. For example, the processing circuitry more specifically may include, but is not limited to, a central processing unit (CPU), an arithmetic logic unit (ALU), a digital signal processor, a microcomputer, a field programmable gate array (FPGA), and programmable logic unit, a microprocessor, application-specific integrated circuit (ASIC), etc. According to at least some example embodiments, the hardware and/or hardware/software combination of the aforementioned processing circuitry is configured to perform or control any or all operations discussed in the present disclosure as being performed by the server 130, the controller 280, or any element of the server 130 or controller 280.

A method of connecting user terminals as a group by transmitting and receiving a connection request signal between the user terminals and a method of generating and providing a connection service for each of the user terminals are further described with reference to FIG. 3A to 12.

Description related to technical features made above with reference to FIG. 1 may apply to FIG. 2 and further description related thereto is omitted.

Figure 3A:
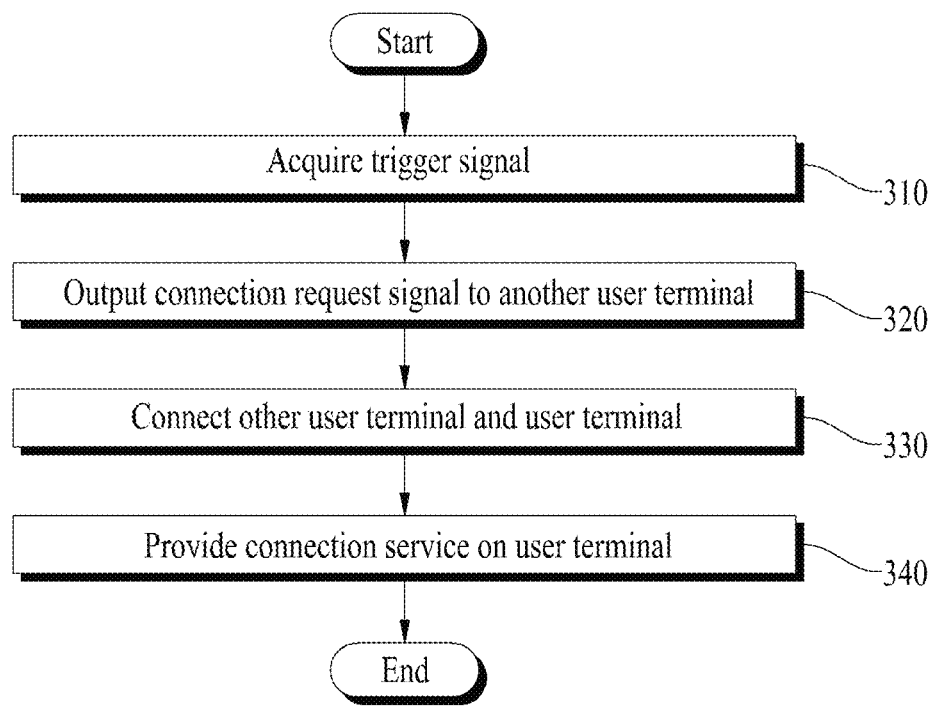
FIG. 3A is a flowchart illustrating an example of a method of connecting to another user terminal as a group and providing a connection service to be displayed on a user terminal from the perspective of the user terminal according to an example embodiment.
Figure 3B:
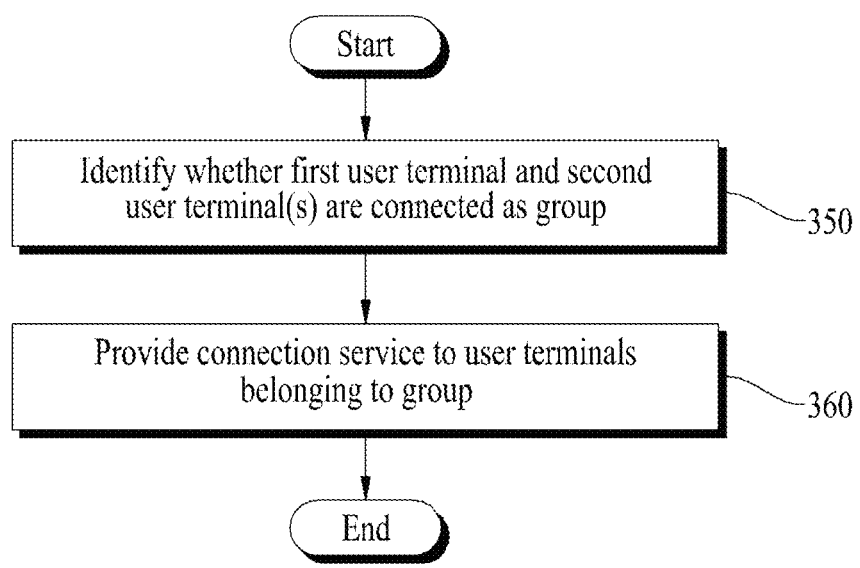
FIG. 3B is a flowchart illustrating an example of a method of providing a connection service to at least a portion of (or each of) user terminals connected as a group from the perspective of a connection service providing server according to an example embodiment.

FIG. 3A is a flowchart illustrating an example of a method of connecting to another user terminal as a group and providing a connection service to be displayed on a user terminal from the perspective of the user terminal according to an example embodiment. FIG. 3B is a flowchart illustrating an example of a method of providing a connection service to at least a portion of (or each of) user terminals connected as a group from the perspective of a connection service providing server according to an example embodiment.

In the following, example embodiments are described based on the user terminal 110 (e.g., a first user terminal) among user terminals (e.g., the user terminals 110, 110-1, 110-2, . . . ) connected as a group and further description related to other user terminals (e.g., second user terminal(s) and third user terminal(s)) excluding the user terminal 110 from the group is omitted. Also, in the following, some operations of the user terminal 110 performed by a component of the controller 220 are described to be performed by the user terminal 110, for clarity of description.

Referring to FIG. 3A, in operation 310, the signal transceiver 222 may acquire a trigger signal for initiating a connection between a plurality of user terminals.

In operation 320, in response to the acquired trigger signal, the signal transceiver 222 may output a connection request signal to at least one another user terminal among the plurality of user terminals through an inaudible frequency range.

In operation 330, the group generator 224 may connect the other user terminal (second user terminal(s)) receiving the connection request signal and the user terminal 110 as a group. The group generator 224 may receive a response of an agreement from the other user terminal that receives the connection request signal and may perform the connection.

In operation 340, the connection service provider 226 may provide a connection service associated with the group on the display 230 of the user terminal 110.

The connection request signal may include information used for the other user terminal (second user terminal(s)) receiving the connection request signal to output the connection request signal to still another user terminal (third user terminal(s)) to connect, as the group, at least one still another user terminal (third user terminal(s)) among the plurality of user terminals that is to be connected as the group. Therefore, although the connection request signal is output only once from the user terminal 110 that acquires the trigger signal, a connection between the user terminals may be performed in a concatenated manner.

The trigger signal refers to a signal for initiating the connection between the plurality of user terminals and may be a signal that causes the user terminal 110 receiving the trigger signal to initially output the connection request signal.

The trigger signal may be a signal acquired by the user terminal 110 in response to joining a desired chatroom of a messenger program installed on the user terminal 110. For example, if the connection is performed in a sports venue or a performance venue, the user terminal 110 may acquire the trigger signal when the user terminal 110 joins a chatroom associated with an event occurring in the sports venue or the performance venue using the messenger program.

Alternatively, the trigger signal may refer to a signal received from an outside through the inaudible frequency range. For example, the trigger signal may be output from a thing (e.g., a speaker installed at any position of the sports venue or the performance venue) present in a place where the connection is performed, and the signal transceiver 222 may acquire the trigger signal by receiving the trigger signal through the microphone 260.

Alternatively, the trigger signal may refer to data acquired by identifying a predetermined (or, alternatively, desired) code. For example, the signal transceiver 222 may acquire the trigger signal by reading a code marked on a thing (e.g., a seat installed at any position of the sports venue or the performance venue) present in a place where the connection is performed through the camera 240. The code may be, for example, a barcode, a quick read (QR) code, or other identification codes, such as a seat number.

In the case of generating a group by connecting a plurality of user terminals, a plurality of user terminals may acquire the trigger signal. For example, the plurality of user terminals may join the chatroom, may receive a signal received through the inaudible frequency range, or may read a predetermined (or, alternatively, desired) code. Here, the connection between the plurality of user terminals may start from each of the plurality of user terminals acquiring the trigger signal. In this case, connecting the entire user terminals as the group may be further quickly performed.

Also, the trigger signal may include information used to classify the plurality of user terminals into two or more groups and to connect the classified user terminals. For example, when the user terminal 110 acquires a trigger signal including information used to connect user terminals as a first group, the user terminals connected by receiving a connection request signal output from the user terminal 110 may belong to the first group. Alternatively, when the user terminal 110 acquires a trigger signal including information used to connect user terminals as a second group, the user terminals connected by receiving a connection request signal output from the user terminal 110 may belong to the second group.

For example, assuming that a connection is performed in a sports venue in which a game between teams A and B is played, a connection request signal for connecting user terminals as a group associated with the team A in response to an access of the user terminal 110 to a chatroom associated with the team A may be output from the user terminal 110. Likewise, a connection request signal for connecting user terminals as a group associated with the team B in response to an access of the user terminal 110 to a chatroom associated with the team B may be output from the user terminal 110. Alternatively, in response to the user terminal 110 receiving a trigger signal output from a speaker at the team A's side of the sports venue or reading a code at the team A's side, the connection request signal for connecting the user terminals as the group associated with the team A may be output from the user terminal 110. The aforementioned description may apply to the team B and further description is omitted. Therefore, the user of the user terminal 110 may belong to a group associated with a team the user desires to cheer and may receive a connection service associated with the corresponding team.

Describing providing of a connection service from the perspective of the connection service providing server 130, the connection service provider 282 of the server 130 may identify that the first user terminal and the second user terminal are connected as the group in response to the connection request signal output from the first user terminal (corresponding to the user terminal 110) receiving the trigger signal to at least one second user terminal (corresponding to the other user terminal) through the inaudible frequency range in operation 350. For example, the server 130 may identify that a corresponding plurality of user terminals is connected as a group based on a signal received from at least one of the plurality of user terminals belonging to the group through the communicator 270.

The connection service provider 282 may identify that the plurality of user terminals is connected as the group and, if a plurality of groups is present, may identify a group to which corresponding user terminals belong. The connection service provider 282 may identify user terminals connected as a specific group and may provide a connection service suitable for the specific group. That is, without identifying user terminals belonging to a group belonged to by a corresponding user terminal, a suitable connection service may be provided to at least a portion of (or each of) the user terminals belonging to the group.

In operation 360, the connection service provider 282 may provide a connection service associated with the group to at least a portion of (or each of) the user terminals belonging to the identified group. For example, the connection service provided from the connection service provider 282 to at least a portion of or each of the user terminals belonging to the group as well as the user terminal 110 may include at least one content among the same text output, the same audio output, and the same screen output. For example, by outputting the same text, the same audio, or the same screen to hundreds of (depending on a connection place, thousands or tens of thousands of) or more user terminals, users of the user terminals belonging to the group may have a sense of homogeneity and a cheering effect may be enhanced in a place, such as a sports venue. "Screen output" may include outputting, that is, displaying a predetermined (or, alternatively desired) color on the display 230 or displaying a color of which saturation or brightness is changed from the color on the display 230, instead of simply outputting, that is, displaying an image file.

The user terminals belonging to the same group through the connection may be synchronized based on time information of each of the user terminals. The time information may include, for example, GPS time information. Therefore, the connection service may include content provided to at least a portion of (or each of) the synchronized user terminals.

For example, the connection service may include content including the same audio (or audio linked between the user terminals) provided to at least a portion of (or each of) the user terminals belonging to the group. The audio may be automatically output to at least a portion of (or each of) the user terminals at a desired timing. The timing may be a time preset by the connection service provider 282 or the user terminal 110. Alternatively, the timing may be a timing at which a specific event occurs in a place where the connection between the user terminals is performed, for example, a homerun occurrence timing in a baseball stadium and a goal occurrence timing in a soccer field.

Description related to technical features made above with reference to FIGS. 1 and 2 may apply to FIGS. 3A and 3B and further description related thereto is omitted.

Figure 4:
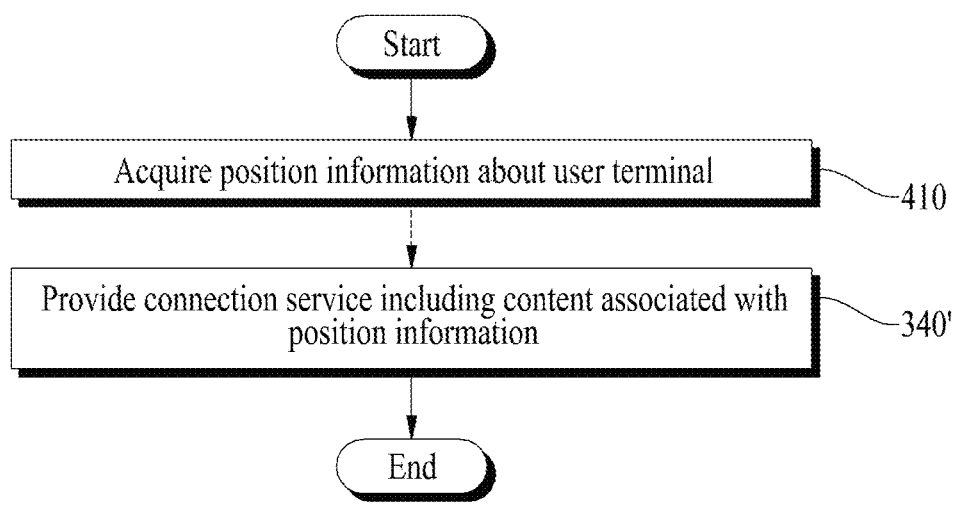
FIG. 4 is a flowchart illustrating an example of a method of providing content associated with position information of a user terminal to be displayed on the user terminal as a connection service according to an example embodiment.

FIG. 4 is a flowchart illustrating an example of a method of providing content associated with position information of a user terminal to be displayed on the user terminal as a connection service according to an example embodiment.

Referring to FIG. 4, in operation 410, the position information acquirer 228 may acquire position information about a position of the user terminal 110. The position information acquirer 228 may acquire the position information from data acquired from a GPS module (not shown) of the user terminal 110, data about a code identified by the camera 240, or a signal input through the microphone 260.

For example, the position information may be acquired through an inaudible frequency range from the position of the user terminal 110 or may be acquired by identifying a predetermined (or, alternatively, desired) code present at the position.

The position of the user terminal 110 may be a place where user terminals is connected as a group. For example, the position information acquirer 228 may acquire position information about a corresponding place by reading a code marked on a thing (e.g., a thing (a seat) installed at any position of a sports venue or a performance venue) present in a place where such a connection is performed through the camera 240. The code may be, for example, a barcode, a QR code, or any other identification codes. Alternatively, the position information acquirer 228 may acquire the position information that is output from a thing (e.g., a speaker installed at a position of the sports venue or the performance venue) present in the place where the connection is performed and is received by the position information acquirer 228 through the microphone 260. Here, the position information acquired by the position information acquirer 228 may include information indicating a position at which the user terminal 110 is present in the place where the connection is performed. For example, the position information may include information indicating a position of the seat at which the user terminal 110 is present.

In operation 340', the connection service provider 226 may provide a connection service including content associated with the acquired position information to be displayed on the user terminal 110. The connection service may be provided from the connection service provider 282. The content associated with the position information refers to content associated with the position of the user terminal 110 in the place where the connection is performed. For example, when the position of the user terminal 110 is a seat for cheering a specific team or a specific performer, the content associated with the position information may include at least one of a text, an image, and an audio for cheering the specific team or the specific performer. The image may include an image or a video captured by the user terminal 110 or the camera 240.

Alternatively, the content associated with the position information may be, as an image, a portion corresponding to position information of a semantic object formed by images provide from a plurality of user terminals among the user terminal belonging to the group. for example, the content associated with the position information may include an image constituting a portion of a card section. Here, the image may be displayed on the display 230 with color/saturation and brightness of the color corresponding to the portion of the card section.

A method of providing content associated with position information as a connection service is further described with reference to FIGS. 5 and 9.

Description related to technical features made above with reference to FIGS. 1 to 3B may apply to FIG. 4 and further description related thereto is omitted.

Figure 5:
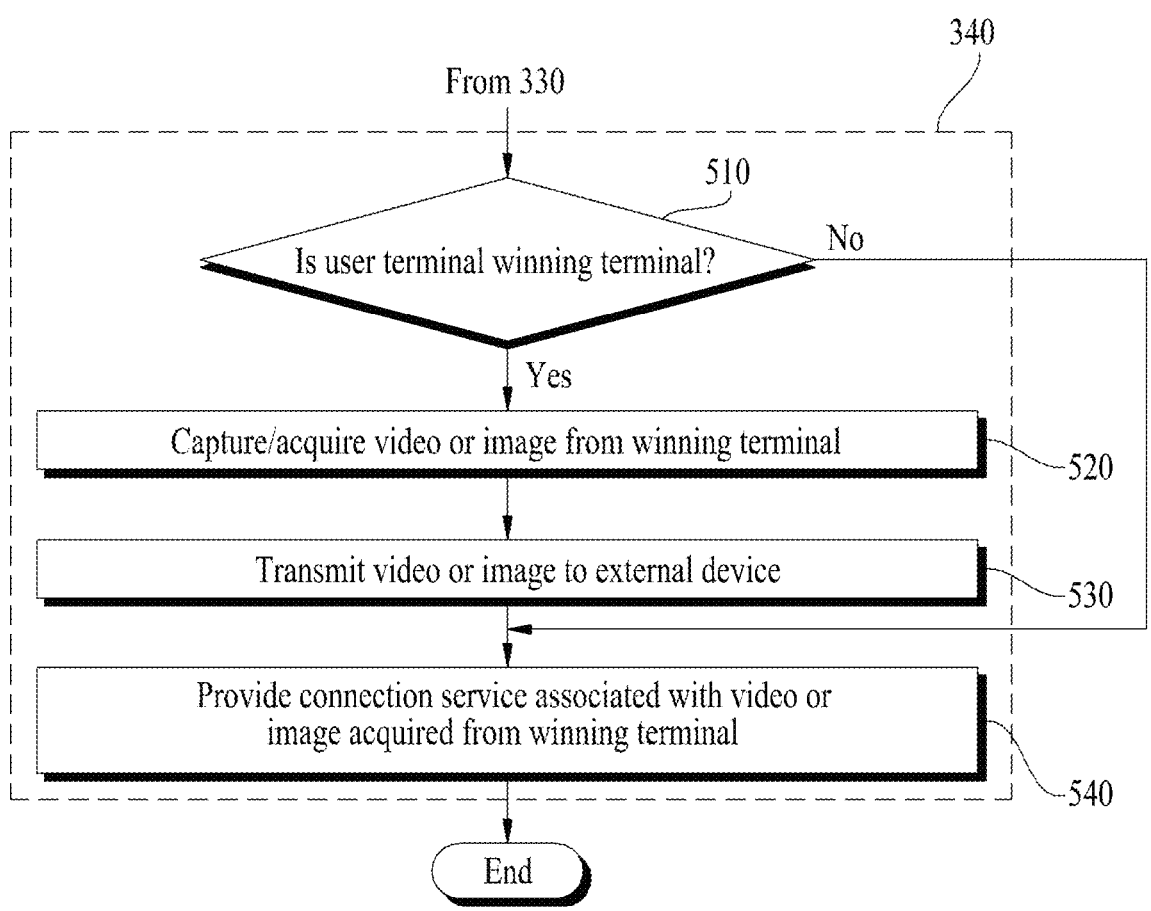
FIG. 5 is a flowchart illustrating an example of a method of providing a connection service associated with a video or an image acquired from a winning terminal to be displayed on a user terminal according to an example embodiment.

FIG. 5 is a flowchart illustrating an example of a method of providing a connection service associated with a video or an image acquired from a winning terminal to be displayed on a user terminal according to an example embodiment.

Hereinafter, a method of determining a winning terminal among user terminals belonging to a group and providing a connection service including a video or an image associated with the winning terminal to at least a portion of (or each of) the user terminals is described with reference to FIG. 5.

Referring to FIG. 5, in operation 510, the connection service provider 282 (or, a determiner of an external device) may determine a winning terminal among user terminals belonging to a group. Determining the winning terminal may be performed by any user terminal, or, alternatively, a predetermined user terminal, among the user terminals belonging to the group.

If the user terminal 110 is determined as the winning terminal, the user terminal 110 may acquire a video or an image in operation 520. For example, the user terminal 110 may capture a video or an image of the user of the user terminal 110 using the camera 240. Capturing may be automatically performed when the user terminal 110 is determined as the winning terminal.

In operation 530, the user terminal 110 may transmit the acquired video or image to an external device. For example, the user terminal 110 may transmit the captured video or image to an external display device or a server, for example, the server 130, managing the external display device to display the captured video or image on the external display device (such as a billboard or a large screen).

In operation 540, the connection service provider 282 (or the external device or the server managing the external server) may provide a connection service associated with the video or the image acquired from the user terminal 110 corresponding to the winning terminal. That is, the video or the image acquired by the user terminal 110 determined as the winning terminal may be provided as the connection service to at least a portion of (or each of) the user terminals belonging to the group. Unless the user terminal 110 is the winning terminal, a video acquired or captured by the winning terminal may be provided to the user terminal 110.

Example embodiments of proceeding with a winning event in a sports venue or a performance venue may be implemented through operations 510 to 540. That is, the example embodiments may be employed to select a predetermined (or, alternatively, desired) number of persons during a progress of an event of selecting the number of persons from the crowd or the audience present in the sports venue or the performance venue and providing a gift or a benefit to the selected number of persons.

An example embodiment of providing an image or a video acquired by a winning terminal to an external display device and at least a portion of (or each of) user terminals belonging to a group is further described with reference to FIG. 7.

Description related to technical features made above with reference to FIGS. 1 to 4 may apply to FIG. 5 and further description related thereto is omitted.

Figure 6:
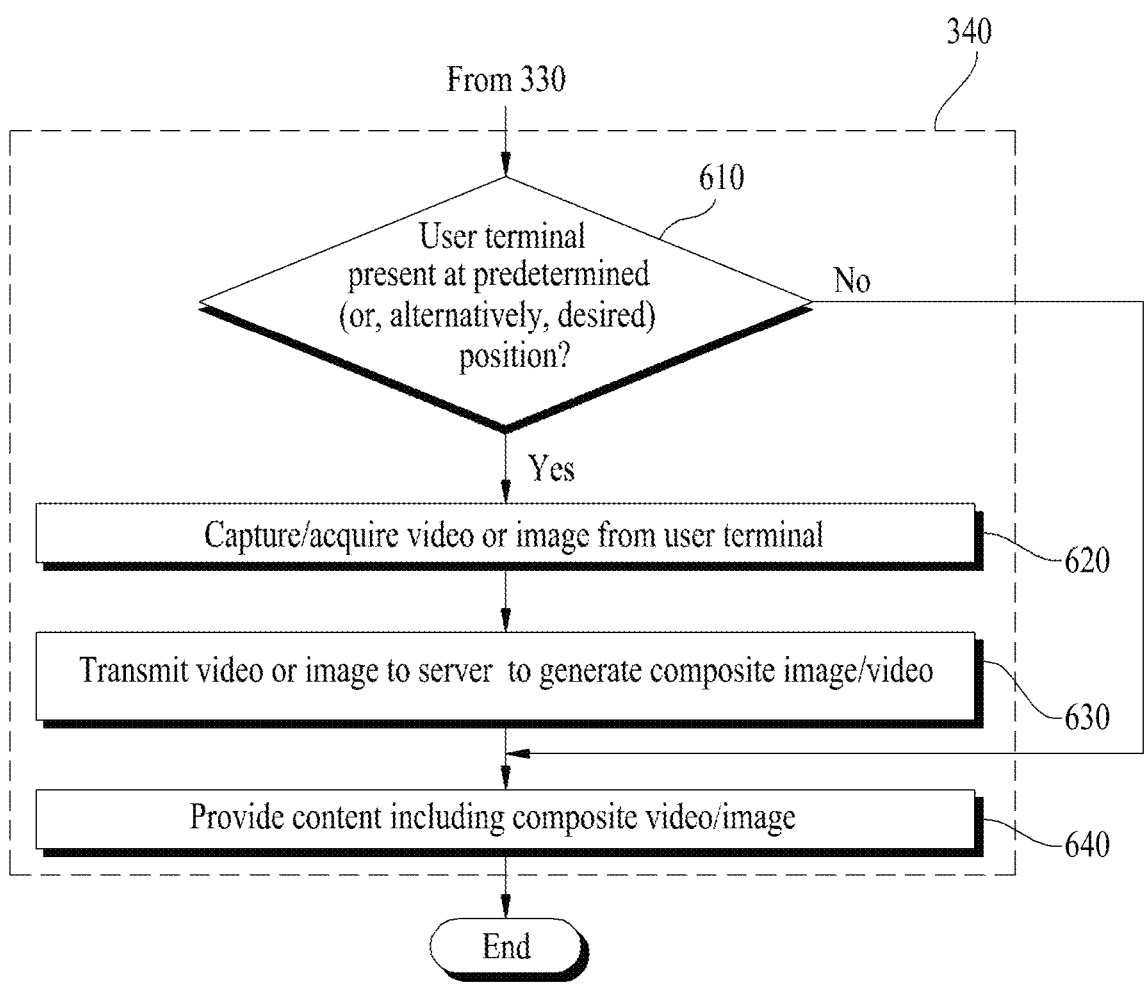
FIG. 6 is a flowchart illustrating an example of a method of providing content including a composite video and/or composite image to be displayed on a user terminal as a connection service according to an example embodiment.

FIG. 6 is a flowchart illustrating an example of a method of providing content including a composite video and/or composite image to be displayed on a user terminal as a connection service according to an example embodiment.

A connection service provided to at least a portion of (or each of) user terminals belonging to a group may include a composite image or a composite video. The composite video or the composite image may be content to which a three-dimensional (3D) effect or a dynamic effect is applied. For example, the composite video or the composite image may be content represented in a similar manner to a moving picture.

The composite video may be generated by composing images or videos by captured by user terminals present at a desired position among user terminals belonging to a group. The following description is made based on a method of generating a composite video or a composite image depending on whether the user terminal 110 is present at the position.

Referring to FIG. 6, in operation 610, the connection service provider 282 may determine whether the user terminal 110 is present at a predetermined (or, alternatively, desired) position to generate a composite video or a composite image. The predetermined (or, alternatively, desired) position may include positions suitable for visually identifying a specific event occurring in a place where the connection as the group is performed. For example, the position may include seat positions suitable for visually identifying a goal in a soccer field. The position information of the user terminal 110 described above with reference to FIG. 4 may be used for determining in operation 610. Also, at least one of a position, a height, and an angle of the user terminal 110 may be additionally used as data acquired from sensor(s) included in the user terminal 110.

Operation 610 may be performed by not the connection service provider 282 but a component of the user terminal 110.

When the user terminal 110 is determined to be present at the position, the user terminal 110 may acquire a video or an image in operation 620. For example, the user terminal 110 may capture a specific event occurrence spot in the place where the connection as the group is performed using the camera 240. Here, such capturing may be performed in response to a request from the user terminal 110 (user), that is, under control of the user terminal 110, or may be performed at a predetermined (or, alternatively, desired) timing when the user terminal 110 is determined to be present at the position. The timing may be an occurrence time of the specific event in the place where the connection as the group is performed.

In operation 630, the user terminal 110 may transmit the acquired video or image to a server configured to generate a composite video or a composite image. Alternatively, the user terminal 110 may transmit the acquired video or image to an exclusive server or the server 130 configured to generate the composite video or the composite image.

The exclusive server or the server 130 may generate the composite video or the composite image based on videos or images received from the user terminal 110 and user terminals determined to be present at a predetermined (or, alternatively, desired) position. Known arts for generating a composite image/video having a 3D effect or a dynamic effect using a plurality of images/videos may be used to generate the composite video or the composite image. Further description related thereto is omitted.

In operation 640, the connection service provider 282 (or, the exclusive server) may provide the composite video or the composite image to the user terminal 110 and at least a portion of (or each of) the user terminals belonging to the group as the connection service. That is, the user terminals including the user terminal 110 may receive content including the composite video or the composite image as the connection service. If the user terminal 110 is not present at the predetermined (or, alternatively, desired) position, the generated composite video or composite image may be provided to the user terminal 110 as the connection service without the aforementioned capturing operations.

Through operations 610 to 640, an image or a video related to a specific event may be further realistically shared between user terminals in response to an occurrence of the specific event in a sports venue or a performance venue.

A method of generating a composite video or a composite image and a method of providing the generated composite video or composite image to at least a portion of (or each of) user terminals is further described with reference to FIG. 12.

Description related to technical features made above with reference to FIGS. 1 to 5 may apply to FIG. 6 and further description related thereto is omitted.

Figure 7:
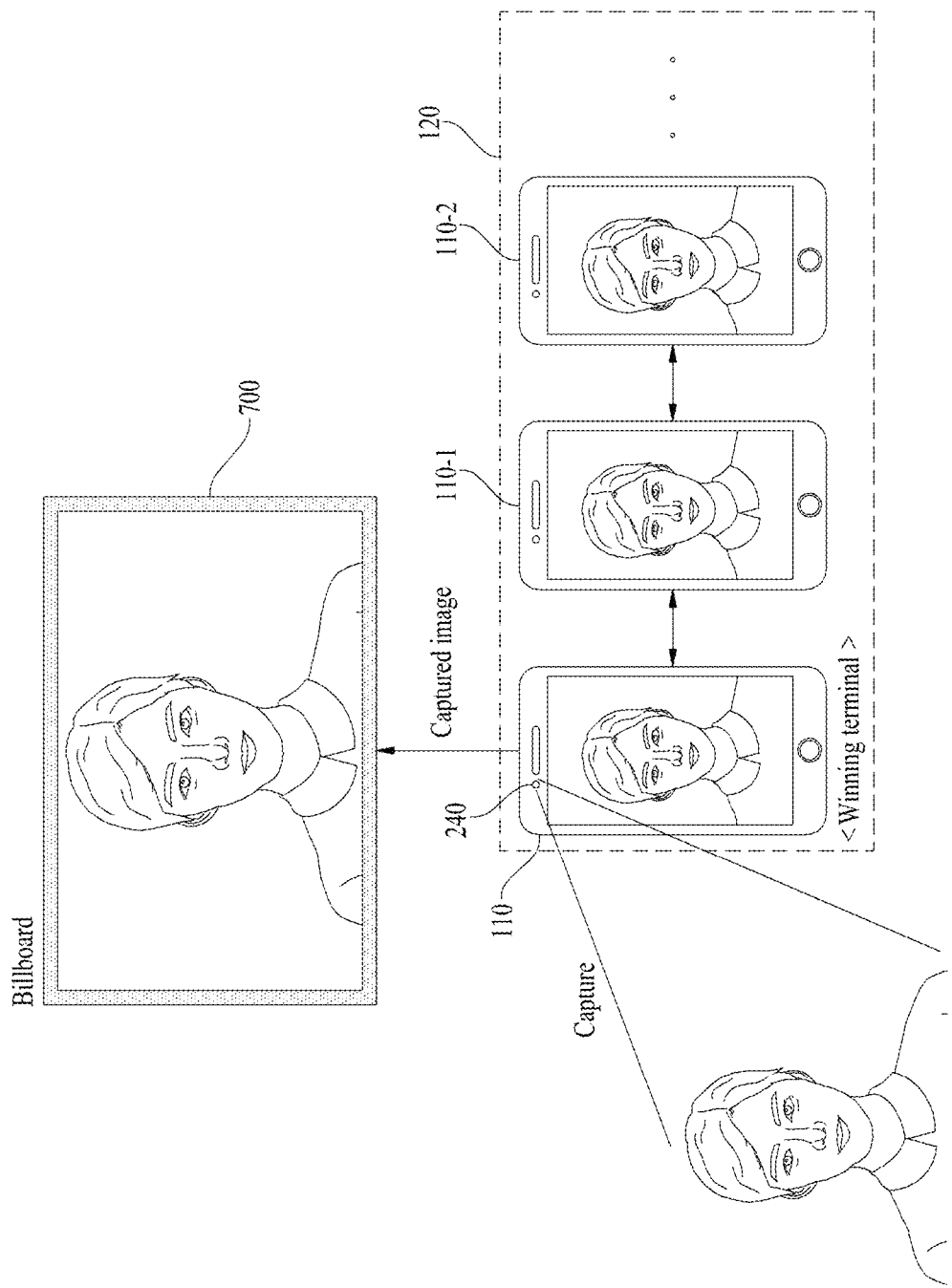
FIG. 7 illustrates an example of displaying a video or an image acquired from a winning terminal on a user terminal as a connection service according to an example embodiment.

FIG. 7 illustrates an example of displaying a video or an image acquired from a winning terminal on a user terminal as a connection service according to an example embodiment.

The example embodiment of FIG. 5 is further described with reference to FIG. 7.

Referring to FIG. 7, the user terminal 110 is determined as a winning terminal in the connected group 120. The user terminal 110 may capture a video or an image of the user of the user terminal 110 determined as the winning terminal. Capturing may be automatically performed when the user terminal 110 is determined as the winning terminal or when the user terminal 110 agrees to be determined as the winning terminal. Otherwise, another user terminal may be determined as the winning terminal. That is, the aforementioned operation 510 may be performed again.

The captured image or video may be transmitted to a device (an external display device 700 or a server (not shown) configured to manage the external display device 700) associated with the external display device 700 to display the captured image or video on the external display device 700, for example, a billboard.

The captured image or video may be displayed on the external display device 700 and may be displayed on all of the user terminals 110, 110-1, 110-2, . . . , belonging to the group 120 as the connection service.

Therefore, an example embodiment of running a winning event in a sports venue or a performance venue may be implemented.

Description related to technical features made above with reference to FIGS. 1 to 6 may apply to FIG. 7 and further description related thereto is omitted.

Figure 8:
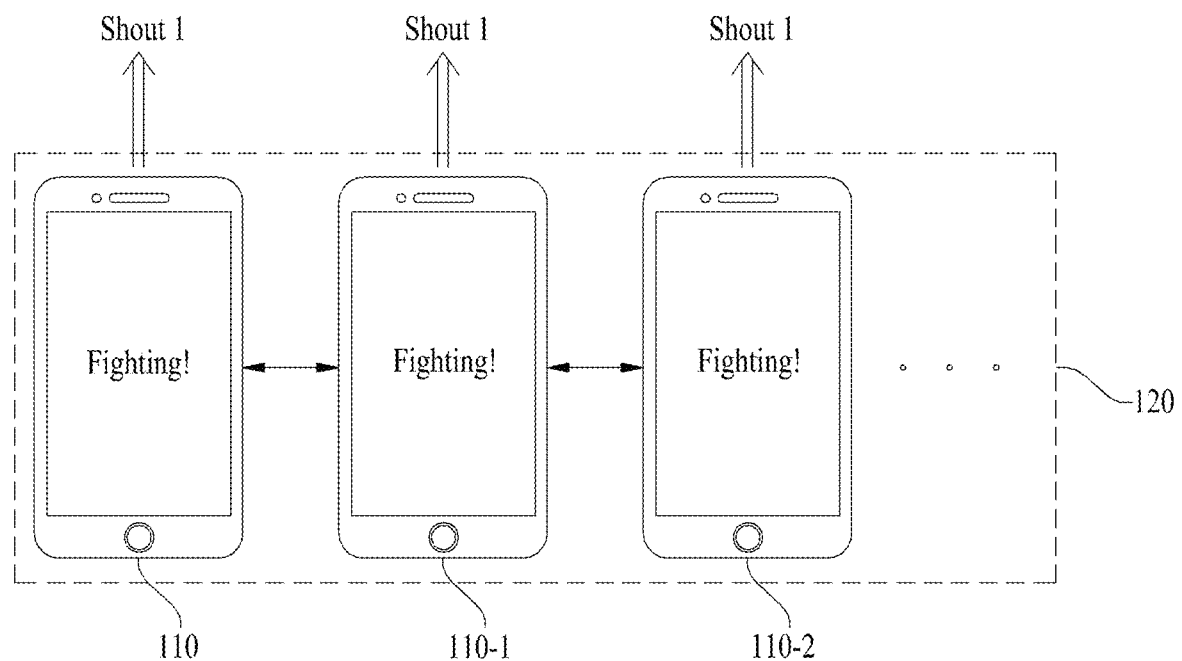
FIG. 8 illustrates an example of providing content including the same text and/or the same audio to at least a portion of or each of user terminals connected as a group as a connection service according to an example embodiment.

FIG. 8 illustrates an example of providing, as a connection service, content including the same text and/or the same audio to at least a portion of (or each of) user terminals connected as a group according to an example embodiment.

Referring to FIG. 8, the same audio may be output to all of the user terminals 110, 110-1, 110-2, . . . belonging to the connected group 120. For example, shout sound (shout1) may be provided to the user terminals 110, 110-1, 110-2, . . . as a connection service.

Since the user terminals 110, 110-1, 110-2, . . . are synchronized based on time information, the audio may be synchronized and thereby output to the user terminals 110, 110-1, 110-2, . . . .

The connection service provider 282 may synchronize and output different audio for the user terminals 110, 110-1, 110-2, . . . depending on a timing or a circumstance of a place where the connection as the group is performed. That is, different audio (different shout) may be output to the user terminals 110, 110-1, 110-2, . . . based on the timing or the circumstance of the place where the connection as the group is performed. For example, in a sports venue, if a team related to the group 120 is advantageous, a cheering shout may be output from the user terminals 110, 110-1, 110-2, . . . . On the contrary, if the team related to the group 120 is disadvantageous, a hooting shout may be output from the user terminals 110, 110-1, 110-2, . . . .

Accordingly, a realistic cheering in a sports venue or a performance venue is possible.

Meanwhile, referring to FIG. 8, a text, such as a cheering text, may be synchronized and thereby output to the user terminals 110, 110-1, 110-2, . . . . The aforementioned description may apply to output of the text and further description is omitted.

Further, although not illustrated, the same image (color) may be synchronized and thereby output to the user terminals 110, 110-1, 110-2, . . . . For example, a color symbolizing a team (or a performer) associated with the group 120 may be synchronized and thereby output to the user terminals 110, 110-1, 110-2, . . . . The aforementioned description related to output of the audio may apply to output of the same screen and further description is omitted.

Alternatively, dissimilar to FIG. 8, not the same audio/text but content including audio/text related between at least a portion of the user terminals may be provided to at least a portion of (or each of) the user terminals connected as the group.

The related audio may produce a predetermined (or, alternatively, desired) chord, or may form a predetermined (or, alternatively, desired) pattern or melody when the audio is output from a plurality of terminals. The related text may be a text representing the same subject. Alternatively, the related text may be a text output in a different display form, for example, a different font and/or color even in the case of the same text.

The aforementioned technical description may apply even to outputting the content including the related audio/text with respect to user terminals.

Description related to technical features made above with reference to FIGS. 1 to 7 may apply to FIG. 8 and further description related thereto is omitted.

Figure 9:
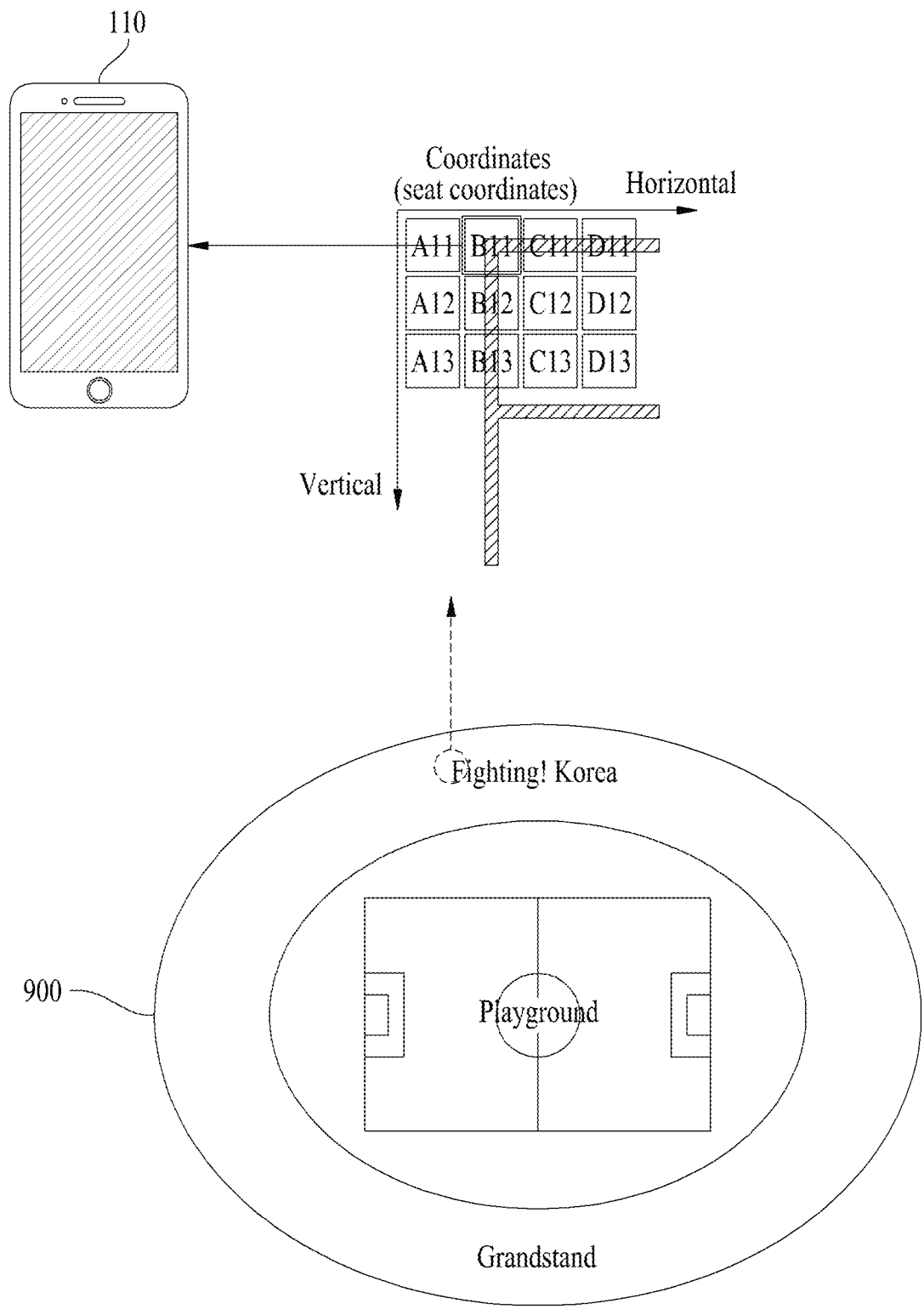
FIG. 9 illustrates an example of providing content associated with position information of a user terminal belonging to a group on a user terminal as a connection service according to an example embodiment.

FIG. 9 illustrates an example of displaying content associated with position information of a user terminal belonging to a group on a user terminal as a connection service according to an example embodiment.

Referring to FIG. 9, a position of the user terminal 110 may correspond to a seat of a sports venue (or a performance venue) 900 and position information may correspond to a seat position.

A connection service provided to user terminals belonging to a group may be configured to provide a screen output corresponding to position information of a user terminal belonging to the group to the corresponding user terminal. For example, a screen output corresponding to a seat position corresponding to position information of the user terminal may be output to the corresponding user terminal as the connection service.

Here, the screen output of the user terminal may constitute a portion of a semantic object formed by the screen output of a plurality of user terminals among the user terminals belonging to the group. Here, the semantic object is formed by the connection service provided to the plurality of user terminals among the user terminals included in the group. The entire connection service provided to the plurality of user terminals may have a certain meaning. For example, the semantic object may be a shape of a card section formed by audience in a sports venue or a performance venue.

Referring to FIG. 9, the crowd of the sports venue 900 forms a card section "Fighting! Korea" using their own user terminals. Here, position information of the user terminal 110 may correspond to a seat position B11. A screen output corresponding to the position information of the user terminal 110 may be a left edge portion of alphabet F. Accordingly, a color of the alphabet F to be represented through the card section may be displayed on the display 230 of the user terminal 110.

The connection service provider 282 may perform a card section of "Fighting! Korea" in the sports venue 900 by identifying a plurality of user terminals present at positions at which a text "Fighting! Korea" is formed from among user terminals of the crowd at the sports venue and by providing a screen output corresponding to position information of each of the identified plurality of terminals.

Accordingly, the crowd at the sports venue do not need to be specially trained or to have special equipment to perform the card section and may easily perform the card section simply using user terminals such as smartphones.

The text "Fighting! Korea" used for the card section may be determined in advance by the connection service provider 282. Alternatively, the text used for the card section may be determined by another external device or a winning terminal among user terminals belonging to a group.

As described above, the card section may be provided to the user terminals belonging to the group at the aforementioned timing. Further description related thereto is omitted.

The technical description of FIG. 9 may similarly apply to outputting the content including the related audio/text with respect to user terminals, which is described above with reference to FIG. 7. Further description related thereto is omitted.

Description related to technical features made above with reference to FIGS. 1 to 8 may apply to FIG. 9 and further description related thereto is omitted.

Figure 10:
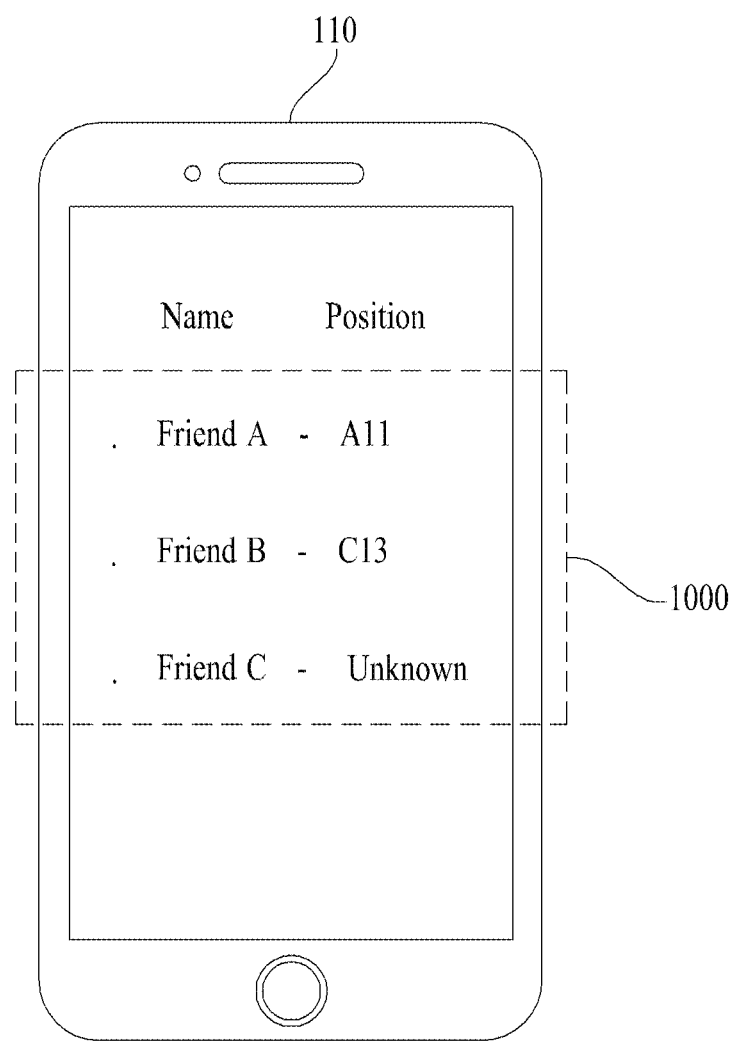
FIG. 10 illustrates an example of providing content including information about a user having a personal relationship with a user of a user terminal on the user terminal as a connection service according to an example embodiment.

FIG. 10 illustrates an example of providing content including information about a user having a personal relationship with a user of a user terminal on the user terminal as a connection service according to an example embodiment.

Hereinafter, an example of a method of providing, as a connection service, content including information about a user having a personal relationship with a user of the user terminal 110 is described with reference to FIG. 10.

The connection service provider 282 of the server 130 (or the connection service provider 226 of the user terminal 110) may determine whether the user terminal of the user having the personal relationship with the user of the user terminal 110 is included in user terminals belonging to a group.

Here, the personal relationship may represent a friend relation or an acquaintance between a user and another user in a social network service (SNS). Alternatively, the personal relationship may represent a relation with another user registered to the user terminal, a friend relation with another user in a messenger program or a game program installed on the user terminal, and the like.

When the user terminal of the user having the personal relationship with the user of the user terminal 110 is determined to be included in the user terminals connected as the group, the connection service provider 282 may provide, to the user terminal 110, the connection service that includes content including information about the user having the personal relationship.

Information about the user having the personal relationship may be provided in a form of a list or a table. Information about the user having the personal relationship may include a name or an ID of a user determined to belong to the group and a position of the user. The position of the user may represent a position of the user in a place where a connection as a group is performed, such as, for example, a position of a seat at which the user is present.

Although not illustrated, the position of the user having the personal relationship may be provided as an image. For example, an image of a sports venue or a performance venue may be displayed on the user terminal 110. Here, the image may be provided by marking a position or a seat of the corresponding venue at which the user having the personal relationship is present.

In the example embodiment, another user having a personal relationship with the user in a crowded environment, such as the sports venue or the performance venue, may be easily found. Also, if another user unnoticed by the user and having a personal relationship with the user among users, that is, the user terminals belonging to the group is present, the other user may be easily found.

If position information of the user having the personal information is not acquirable (e.g., if the corresponding user does not acquire position information about a seat using a user terminal of the user), the position information may not be included in information about the user having the personal relationship.

Description related to technical features made above with reference to FIGS. 1 to 9 may apply to FIG. 10 and further description related thereto is omitted.

Figure 11:
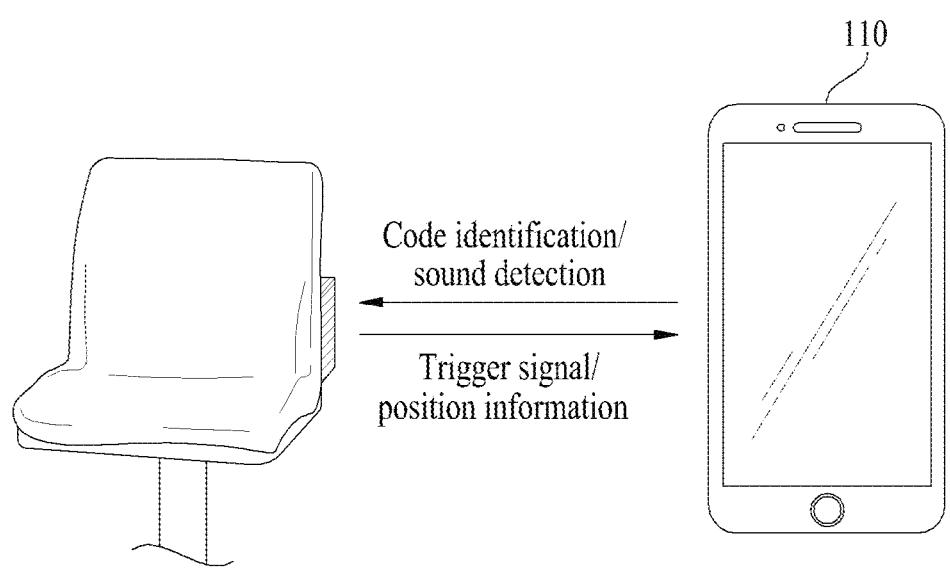
FIG. 11 illustrates an example of acquiring a trigger signal for initiating a connection between a plurality of user terminals and/or position information about a position of a user terminal according to an example embodiment.

FIG. 11 illustrates an example of acquiring a trigger signal for initiating a connection between a plurality of user terminals and/or position information about a position of a user terminal according to an example embodiment.

Hereinafter, an example of acquiring the aforementioned trigger signal and/or position information is further described with reference to FIG. 11. Referring to FIG. 11, the user terminal 110 may acquire the trigger signal and/or position information by identifying a code (e.g., a barcode, a QR code, and a seat number) present on a seat at a sports venue or a performance venue through a camera or by receiving the code from the user.

Also, the user terminal 110 may acquire the trigger signal and/or position information by receiving a sound signal of an inaudible frequency range output from the seat or another position at the sports venue or the performance venue.

Description related to technical features made above with reference to FIGS. 1 to 10 may apply to FIG. 11 and further description related thereto is omitted.

Figure 12:
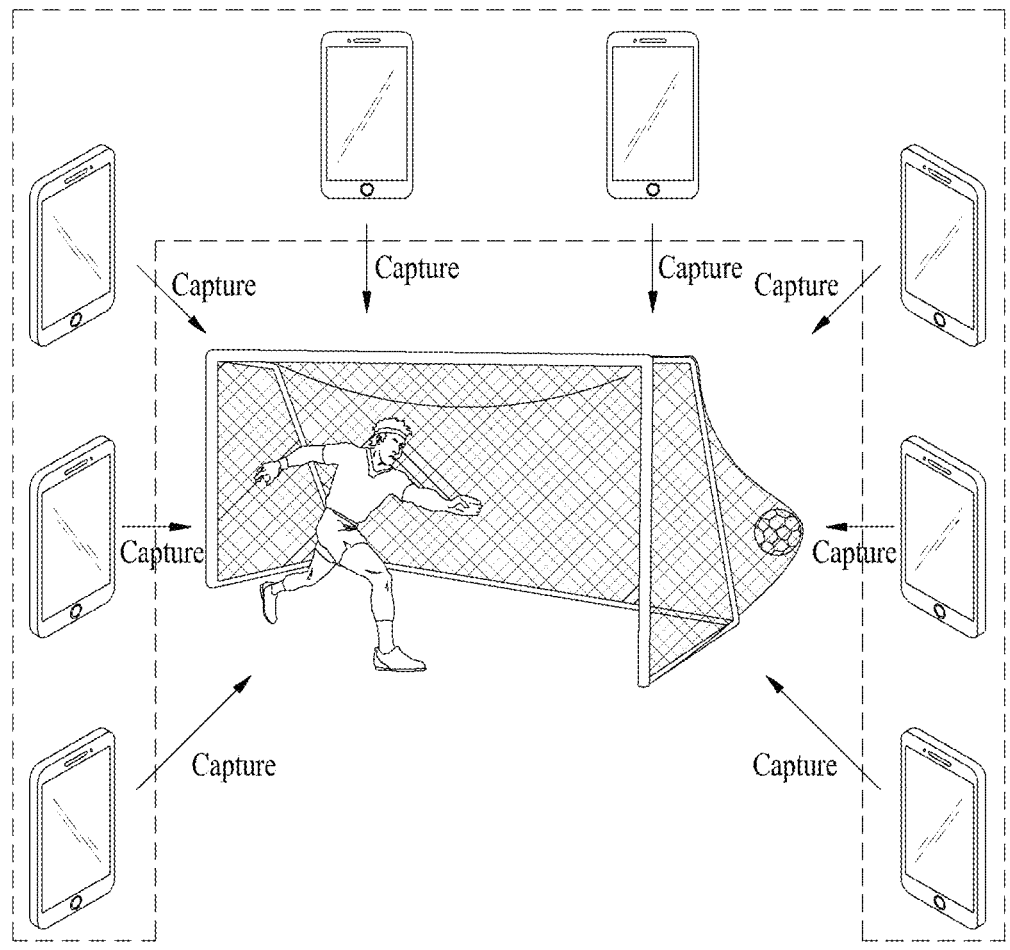
FIG. 12 illustrates an example of providing content including a composite video and/or a composite image on a user terminal as a connection service according to an example embodiment.
Figure 12:
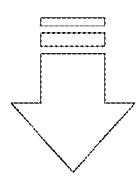
Figure 12:
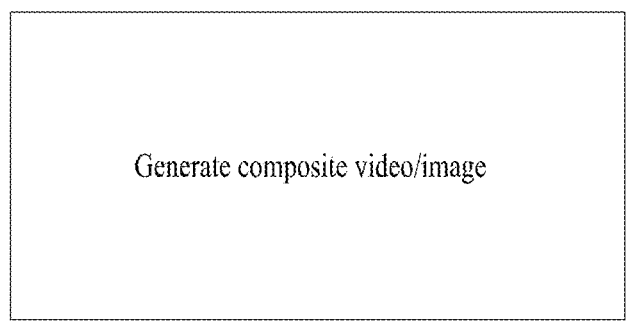

FIG. 12 illustrates an example of providing content including a composite video and/or a composite image on a user terminal as a connection service according to an example embodiment.

Hereinafter, an example of generating the composite video or the composite image of FIG. 6 is further described with reference to FIG. 12.

Referring to FIG. 12, the connection service provider 282 may identify user terminals present at positions suitable for visually identifying a goal post of a soccer field from among user terminals belonging to the group 120. For example, user terminals of users present to the left and the right of and behind the goal post may be determined to be present at suitable positions, and images or videos captured by the user terminals may be used to a composite video or a composite image.

For example, the connection service provider 282 (or a server configured to generate a composite video or a composite image) may acquire videos or images captured within a predetermined (or, alternatively, desired) period of time around a time at which a goal is made from among the videos or the images captured by the user terminals determined to be present at the suitable positions, and may generate the composite video or the composite image by combining the acquired videos or images.

The connection service provider 282 (or the exclusive server) may provide the generated composite video or composite image to at least a portion of (or each of) the user terminals belonging to the group 120 as the connection service.

Description related to technical features made above with reference to FIGS. 1 to 11 may apply to FIG. 12 and further description related thereto is omitted.

Figure 13:
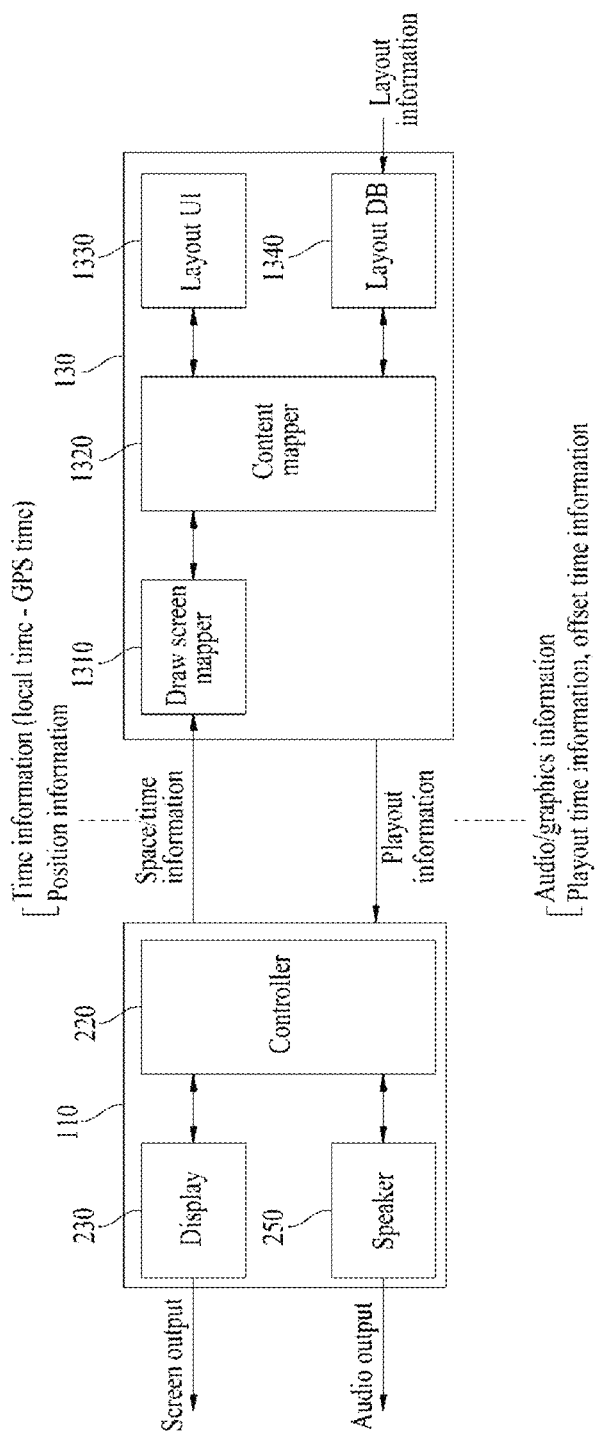
FIG. 13 illustrates an example of a method of providing a connection service from a connection service providing server to a user terminal based on space information and time information acquired from the user terminal according to an example embodiment.

FIG. 13 illustrates an example of a method of providing a connection service from a connection service providing server to a user terminal based on space information and time information acquired from the user terminal according to an example embodiment.

Hereinafter, a method in which, in response to transmitting space information and time information associated with the user terminal 110 acquired by the user terminal 110 being transmitted to the server 130, the server 130 determines information about content to be output to the user terminal 110 and time information about a time at which the content is to be output and transmits the determined information to the user terminal 110 is described with reference to FIG. 13.

The space information acquired from the user terminal 110 may correspond to position information associated with the user terminal 110. Also, the time information acquired by the user terminal 110 may correspond to the aforementioned time information associated with the user terminal 110.

For example, the user terminal 110 may acquire geographical information, such as a latitude, a longitude, and a height of the user terminal 110 acquired through a GPS and/or a sensor included in the user terminal 110 and/or seat information of a sports venue or a performance venue as space information (position information). The user terminal 110 may transmit the acquired position information to the server 130.

The time information acquired by the user terminal 110 may include information about a GPS time and a local time output from the user terminal 110 as the time information associated with the user terminal 110. For example, the time information may represent a difference between the local time and the GPS time. The user terminal 110 may transmit the acquired time information to the server 130.

The server 130 may acquire, for example, information about a group connection place from a database (e.g., a layout database (DB) 1340). Place information may be an image including seat information as an image associated with a corresponding place, for example, the sports venue or the performance venue. The layout DB 1340 may be an internal configuration of the server 130 or a separate device present outside the server 130.

A draw screen mapper 1310 of the server 130 may map the user terminal 110 at a position corresponding to position information of the user terminal 110 in an image associated with the place based on the position information acquired from the user terminal 110. For example, the draw screen mapper 1310 may map the user terminal 110 at a position of an image corresponding to the seat represented by the position information of the user terminal 110. The aforementioned mapping may relate to mapping the user terminal 110 to a pixel of the image corresponding to the seat represented by the position information of the user terminal 110.

A content mapper 1320 may determine information about content as a connection service to be provided to the user terminal 110 based on position information and time information (i.e., space information and time information) acquired from the user terminal 110. Information about the content may include information about an audio and/or information about graphics to be output from the user terminal 110 as playout information. Also, the playout information may include information associated with an output time of the content at the user terminal 110. Information associated with the output time may include information about a time at which the content is output to the user terminal 110 and offset time information. The server 130 may transmit the determined playout information to the user terminal 110.

A layout user interface (UI) 1330 may provide an interface or a user interface used for functions performed by components, for example, the draw screen mapper 1310, the content mapper 1320, the layout UI 1330, and the layout DB 1340, of the server 130. The components, for example, the draw screen mapper 1310, the content mapper 1320, the layout UI 1330, and the layout DB 1340, of the server 130 may be components of the connection service provider 282.

The user terminal 110 may receive the playout information from the server 130 and may output content corresponding to the connection service based on the received playout information.

A method of determining content to be output to the user terminal 110 based on space information and time information acquired from the user terminal 110 and outputting the determined content is further described with reference to FIG. 14.

Description related to technical features made above with reference to FIGS. 1 to 12 may apply to FIG. 13 and further description related thereto is omitted.

FIG. 14 is a flow diagram illustrating an example of a method of providing a connection service from a connection service providing server to a user terminal based on space information and time information acquired from the user terminal according to an example embodiment.

The method of providing the connection service to the user terminal 110 of FIG. 13 is further described with reference to operations 1405 to 1490 of FIG. 14.

Referring to FIG. 14, in operation 1405, the user terminal 110 may acquire time information and position information associated with the user terminal 110. The time information associated with the user terminal 110 may include information about a GPS time and a local time of the user terminal 110 at which the corresponding time information is acquired. The local time may be a time at which corresponding information is output to the user terminal 110. The GPS time may be a time at which corresponding information is acquired using a GPS module included in the user terminal 110 (or a time acquired from an outside). For example, the time information associated with the user terminal 110 may represent a difference between the local time and the GPS time.

In operation 1420, the user terminal 110 may transmit the acquired time information and position information to the server 130 that provides a connection service. Meanwhile, the server 130 may receive time information and position information associated with each corresponding terminal from each of user terminals belonging to a group.

In operation 1410, the server 130 may acquire an image (a draw image) associated with a group connection place from the layout DB 1340. The server 130 may acquire seat information of a corresponding place from the layout DB 1340 or may extract the seat information from the acquired image.

In operation 1430, the server 130 may map the position information received from the user terminal 110 to the acquired or extracted draw image. That is, the server 130 may map the user terminal 110 at a position corresponding to position information of the user terminal 110 in the draw image. Although not illustrated, the server 130 may provide the draw image to which the user terminal 110 (or, additionally another user terminal belonging to the group) is mapped to the user terminal 110 (or each of at least a portion of the user terminals belonging to the group). Through this, the user of the user terminal 110 may verify a position of the user, for example, a seat position or a position of another user belonging to the group.

In operation 1440, the server 130 may determine information about content to be output from user terminals belonging to the group and information about an output time of the content based on the received position information and time information.

The server 130 may determine information about content to be output from each corresponding user terminal based on position information received from each of the user terminals (of at least a portion of the user terminals) belonging to the group and may determine offset time information associated with each of the user terminals based on the received time information. Also, the server 130 may determine an output time at which corresponding content is output from each corresponding user terminal based on the received position information and/or time information and the content to be output from each corresponding user terminal.

For example, the server 130 may determine a portion (graphics) of a card section to be output to the user terminal 110 based on the position information of the user terminal 110. Alternatively, the server 130 may determine a cheering text and audio to be output to the user terminal 110 based on the position information of the user terminal 110 (e.g., grandstand of a cheering team where the user terminal 110 is present).

The information associated with the output time may include the output time at which the content is to be output and offset time information. The offset time information associated with each of the user terminals belonging to the group may be calculated based on time information associated with a corresponding user terminal, for example, a difference between a GPS time and a local time represented by the time information of the corresponding user terminal.

Alternatively, information associated with the output time may include the output time at which the content is to be output. In this case, the offset time information may be calculated and determined by the user terminal 110.

In operation 1450, the server 130 may transmit information about the determined content and information about the output time to at least a portion of (or each of) the user terminals belonging to the group. Therefore, the user terminal 110 may receive information about the content and information about the output time of the content from the server 130.

The user terminal 110 may output the content at the time determined based on the received information about the output time. A method of outputting the content from the user terminal 110 is further described with reference to operations 1460 to 1490.

In operation 1460, the user terminal 110 may determine whether the content is present in the user terminal 110 based on the received information about the content. That is, in operation 1490, the user terminal 110 may retrieve the content from the user terminal 110 and may output the content. For example, the user terminal 110 may determine whether the content is present in a local content list of the user terminal 110.

In operation 1470, if the content is absent in the user terminal 110, the user terminal 110 may request the server 130 for the content. In operation 1490, the user terminal 110 may receive the requested content from the server 130 and may output the content.

Alternatively, although the content is absent in the user terminal 110, the content may be generated by the user terminal 110. In this case, the user terminal 110 may generate and output the content. The content capable of being generated by the user terminal 110 may be, for example, a text, graphics of a mono color, graphics in a desired pattern, a simple audio (buzzing sound), etc.

Meanwhile, the user terminal 110 may determine a time at which the content is to be output based on the local time of the user terminal 110, a predetermined (or, alternatively, desired) output time included in the received information about the output time, and offset time information, and may output the content at the determined time. The determined time may correspond to a corrected output time.

Further describing with reference to operations 1480 and 1490, the user terminal 110 may determine whether the corrected output time (a corrected playout time) has passed the local time of the user terminal 110 in operation 1480. For example, the user terminal 110 may determine whether a sum of the predetermined (or, alternatively, desired) output time included in the received information about the output time and the offset time information is less than the local time of the user terminal 110.

Unless the corrected output time (corrected playout time) passed the local time of the user terminal 110, the user terminal 110 may output the content at the local time of the user terminal 110 corresponding to the corrected output time in operation 1490. For example, the user terminal 110 may output the content at the local time of the user terminal 110 corresponding to the sum of the output time and the offset time information.

Alternatively, if the corrected output time (corrected playout time) passed the local time of the user terminal 110, the user terminal 110 may adjust the output time of the content in operation 1485. That is, if the corrected output time (corrected playout time) passed the local time of the user terminal 110, the user terminal 110 may shift the content by an elapse time in operation 1485 and may output the shifted content in operation 1490. For example, if the local time of the user terminal 110 passed a sum of the output time and the offset time information, the user terminal 110 may shift the content by the elapse time and may output the shifted content.

The offset time information may have a positive value or a negative value depending on whether the local time is faster or slower than the GPS time. For example, with the assumption that, at a time of acquiring the time information, the local time of the user terminal 110 is 12:00:00 and the GPS time is 12:00:03, the offset time information determined by the server 130 may represent −3 seconds.

Here, if the server 130 determines that a time at which the content is to be output from the user terminal 110 is 12:05:00, the user terminal 110 may output the content at the local time of 12:04:57 unless the local time of the user terminal 110 determined in operation 1480 passes 12:04:57 (12:05:00+(−3 seconds)). If the local time of the user terminal 110 in operation 1480 passes 12:04:57 (12:05:00−3 seconds) and the local time of the user terminal 110 is 12:05:00, the user terminal 110 may shift the content by 3 seconds and may output the shifted content. For example, if the content is audio content, the user terminal 110 may play the audio content from a portion after 3 seconds. The similar method may apply to a case if the content is video content or graphics content.

Through operations 1480 and 1490, contents output to user terminals belonging to the group may be substantially synchronized without synchronizing the user terminals belonging to the group.

The output time determined by the server 130 may be based on the GPS time. Alternatively, as a modified example, the output time determined by the server 130 may be based on a local time of the server 130. Alternatively, the offset time information may be determined by further considering a propagation speed of sound.

The aforementioned operations 1460 to 1490 may be included in operation 340 of FIG. 3A.

Description related to technical features made above with reference to FIGS. 1 to 13 may apply to FIG. 14 and further description related thereto is omitted.

Although the example embodiments describe that a connection service is provided to user terminals belonging to a group through a connection service providing server, it is provided as an example only.

For example, if simple content is provided through the connection service, such as a case in which the connection service simply outputs an audio to a user terminal or controls a screen output of the user terminal, the connection service may be initially forwarded to the user terminal through a trigger signal and then may be provided to at least a portion of (or each of) user terminals belonging to a group through a connection request signal. Alternatively, through a concatenated connection between the user terminals by the connection request signal generated by the user terminal receiving the trigger signal, the connection service may be provided to at least a portion of (or each of) the user terminals belonging to the group. That is, an inaudible frequency range through which the connection request signal is transmitted and received may be used to transmit and receive content included in the connection service.

The systems and/or apparatuses described above may be implemented using hardware components, software components, and/or a combination thereof. For example, the apparatuses and the components described herein may be implemented using one or more general-purpose or special purpose computers, such as, for example, a processor, a controller, an arithmetic logic unit (ALU), a digital signal processor, a microcomputer, a field programmable gate array (FPGA), a programmable logic unit (PLU), a microprocessor, or any other device capable of responding to and executing instructions in a defined manner. The processing device may run an operating system (OS) and one or more software applications that run on the OS. The processing device also may access, store, manipulate, process, and create data in response to execution of the software. For simplicity, the description of a processing device is used as singular; however, one skilled in the art will be appreciated that a processing device may include multiple processing elements and/or multiple types of processing elements. For example, a processing device may include multiple processors or a processor and a controller. In addition, different processing configurations are possible, such as parallel processors, distributed processors, a cloud computing configuration, etc. Moreover, each processor of the at least one processor may be a multi-core processor, but the example embodiments are not limited thereto.

The software may include a computer program, a piece of code, an instruction, or some combination thereof, for independently or collectively instructing or configuring the processing device to operate as desired. Software and/or data may be embodied permanently or temporarily in any type of machine, component, physical equipment, virtual equipment, computer storage medium or device, or in a propagated signal wave capable of providing instructions or data to or being interpreted by the processing device. The software also may be distributed over network coupled computer systems so that the software is stored and executed in a distributed fashion. The software and data may be stored by one or more computer readable storage mediums.

The methods according to the above-described example embodiments may be recorded in non-transitory computer-readable record media including program instructions to implement various operations of the above-described example embodiments. The media may also include, alone or in combination with the program instructions, data files, data structures, and the like. The media may continuously store a program executable by a computer or may temporarily store or the program for execution or download. Also, the media may be various types of recording devices or storage devices in which a single piece or a plurality of pieces of hardware may be distributed over a network without being limited to a medium directly connected to a computer system. Examples of the media may include magnetic media such as hard disks, floppy disks, and magnetic tapes; optical media such as CD-ROM discs and DVDs; magneto-optical media such as floptical disks; and hardware devices that are specially configured to store and perform program instructions, such as read-only memory (ROM), random access memory (RAM), flash memory, and the like. Examples of other media may include recording media and storage media managed at Appstore that distributes applications or sites and servers that supply and distribute various types of software. Examples of program instructions include both machine code, such as produced by a compiler, and files containing higher level code that may be executed by the computer using an interpreter.

While this disclosure includes specific example embodiments, it will be apparent to one of ordinary skill in the art that various alterations and modifications in form and details may be made in these example embodiments without departing from the spirit and scope of the claims and their equivalents. For example, suitable results may be achieved if the described techniques are performed in a different order, and/or if components in a described system, architecture, device, or circuit are combined in a different manner, and/or replaced or supplemented by other components or their equivalents.

What is claimed is:

1. A connection service providing method comprising:
    outputting, by a first user terminal from among a plurality of user terminals, a connection request signal to at least one second user terminal among the plurality of user terminals through an inaudible frequency range based on a trigger signal for initiating a connection between the plurality of user terminals;
    connecting the at least one second user terminal and the first user terminal as a group; and
    providing a connection service associated with the group on the first user terminal,
    wherein the method further comprises
    transmitting time information and position information associated with the first user terminal to a server that provides the connection service, and
    wherein the providing of the connection service includes,
    receiving information about first content and information about an output time of the first content from the server; and
    outputting the first content at a time that is determined based on information about the output time.

2. The method of claim 1, wherein the connection request signal comprises:
    information used for the second user terminal to output a connection request signal to at least one third user terminal to connect the at least one third user terminal among the plurality of user terminals as the group.

3. The method of claim 1, wherein the trigger signal is,
    a signal that is acquired by the first user terminal in response to joining a first chatroom of a messenger program installed on the first user terminal,
    a signal that is received from an outside through the inaudible frequency range, or
    data that is acquired by identifying a first code.

4. The method of claim 1, wherein user terminals belonging to the group are synchronized based on time information of the respective user terminals, and
    the connection service includes content provided for at least a portion of the synchronized user terminals.

5. The method of claim 1, further comprising:
    acquiring the position information about a position of the first user terminal,
    wherein the connection service includes content associated with the position information.

6. The method of claim 5, wherein the position information is acquired through the inaudible frequency range at the position, or acquired by identifying a first code present at the position.

7. The method of claim 5, wherein the connection service is configured to provide a screen output corresponding to position information about a position of each user terminal of at least a portion of the user terminals belonging to the group to said each user terminal, and
    the screen output of said each user terminal belonging to the group configures a portion of a semantic entity that is formed by screen outputs of a plurality of user terminals among the user terminals belonging to the group.

8. The method of claim 1, wherein the connection service comprises:
at least one content among the same text output, the same audio output, and the same screen output provided to at least a portion of user terminals belonging to the group.

9. The method of claim 8,
wherein the connection service comprises:
content including the same audio provided to at least a portion of the user terminals belonging to the group, and
wherein the audio is automatically output to at least a portion of the user terminals at a first timing.

10. The method of claim 1, wherein at least one of user terminals belonging to the group is determined as a winning terminal, and
in response to the first user terminal being determined as the winning terminal, content including a video or an image captured by the first user terminal is provided as the connection service to at least a portion of the user terminals belonging to the group.

11. The method of claim 10, further comprising:
transmitting the captured video or image to an external display device or a server that manages the external display device to display the captured video or image on the external display device.

12. The method of claim 1,
wherein the connection service comprises:
a composite image or a composite video provided to at least a portion of user terminals belonging to the group, and
wherein the composite video or the composite image is generated by composing images or videos captured by user terminals present at a first position among the user terminals belonging to the group.

13. The method of claim 12, further comprising:
in response to the first user terminal being determined to be present at the first position based on position information about a position of the first user terminal,
transmitting an image or a video captured by the first user terminal to a server; and
receiving content comprising the composite video or the composite image from the server.

14. The method of claim 12, wherein the composite video or the composite image is content to which a three-dimensional (3D) effect or a dynamic effect is applied.

15. The method of claim 1, wherein, in response to a user terminal of a user having a personal relationship with a user of the first user terminal being included in user terminals belonging to the group, the connection service includes content including information about the user having the personal relationship.

16. The method of claim 1, wherein the outputting of the first content comprises:
searching the first user terminal for the first content based on information about the first content and outputting the first content, and
in response to the first content being absent in the first user terminal, requesting the server for the first content and outputting the first content received from the server.

17. The method of claim 1, wherein the time information includes information about a global positioning system (GPS) time and a local time of the first user terminal at a time at which corresponding time information is acquired,
the information about the output time includes a first output time at which the first content is to be output, and the outputting of the first content includes outputting the first content at a time that is determined based on offset time information calculated based on the local time of the first user terminal, the first output time, and the time information.

18. The method of claim 17, wherein the offset time information is a difference between the GPS time and the local time of the first user terminal at the time at which the time information is acquired, and
the outputting of the first content includes outputting the first content at the local time of the first user terminal corresponding to a corrected output time that is determined based on the first output time and the offset time information.

19. The method of claim 18, wherein the outputting of the first content includes shifting and outputting the first content by an elapse time if the local time of the user terminal passes the corrected output time.

20. A non-transitory computer-readable record medium storing computer instructions that, when executed by a processor, cause the processor to perform the method of claim 1.

21. A first electronic device comprising:
processing circuitry configured to,
output a connection request signal to at least a second electronic device through an inaudible frequency range based on a trigger signal for initiating a connection between a plurality of electronic devices, the plurality of devices including the first and second electronic device,
connect the second electronic device and the first electronic device as a group, and
provide a connection service associated with the group on the first electronic device,
wherein the processing circuitry is further configured to transmit time information and position information associated with the first user terminal to a server that provides the connection service, and
wherein the processing circuitry is configured to
receive information about first content and information about an output time of the first content from the server; and
output the first content at a time that is determined based on information about the output time.

22. The first electronic device of claim 21, wherein the processing circuitry is further configured to acquire the position information about a position of the first electronic device.

23. A connection service providing method comprising:
identifying, by a server, that a first user terminal and a second user terminal are connected as a group in response to a connection request signal that is output from the first user terminal to at least one second user terminal through an inaudible frequency range; and
providing a connection service associated with the group to at least a portion of user terminals belonging to the group,
wherein the method further comprises
receiving time information and position information associated with each user terminal from each of the first user terminal and the second user terminal, and
wherein the providing of the connection service includes,
determining information about first content to be output from user terminals belonging to the group and information about an output time at which the first content is to be output, based on the received position information and time information; and transmitting the determined information about the first content and information about the output time to at least a portion of the user terminals belonging to the group.

24. The method of claim 23, wherein the determining comprises:

determining information about content to be output from each of the user terminals belonging to the group based on position information received from each of one or more user terminals from among the user terminals belonging to the group; and determining offset time information associated with one or more user terminals from among the user terminals belonging to the group based on time information received from user terminals belonging to the group, the offset time information associated with each of the user terminals belonging to the group being a difference between a global position system (GPS) time and a local time indicated by time information of each corresponding user terminal.

25. The method of claim 23, further comprising:

mapping each received position information to an image associated with a place where a connection as the group is performed.

26. A server that provides a connection service, the server comprising: processing circuitry configured to, receive a signal from at least one user terminal among a plurality of user terminals, identify, based on the received signal, that a first user terminal and a second user terminal are connected as a group based on a connection request signal that is output from the first user terminal to at least the second user terminal through an inaudible frequency range, and provide a connection service associated with the group to at least a portion of user terminals belonging to the group, wherein the processing circuitry is further configured to receive time information and position information associated with each user terminal from each of the first user terminal and the second user terminal, and wherein the processing circuitry is configured to determine information about first content to be output from user terminals belonging to the group and information about an output time at which the first content is to be output, based on the received position information and time information; and transmit the determined information about the first content and information about the output time to at least a portion of the user terminals belonging to the group.

* * * * *